(12) United States Patent
Yoshida et al.

(10) Patent No.: US 12,140,421 B2
(45) Date of Patent: Nov. 12, 2024

(54) DISPLACEMENT SENSOR AND DISPLACEMENT SENSOR SYSTEM

(71) Applicant: Japan System Development Co., Ltd., Tokushima (JP)

(72) Inventors: Yoshiichi Yoshida, Tokushima (JP); Hiroki Tomino, Tokushima (JP)

(73) Assignee: JAPAN SYSTEM DEVELOPMENT CO., LTD., Tokushima (JP)

( * ) Notice: Subject to any disclaimer, the term of this patent is extended or adjusted under 35 U.S.C. 154(b) by 449 days.

(21) Appl. No.: 17/765,047

(22) PCT Filed: Oct. 30, 2020

(86) PCT No.: PCT/JP2020/040762
§ 371 (c)(1),
(2) Date: Mar. 30, 2022

(87) PCT Pub. No.: WO2021/095557
PCT Pub. Date: May 20, 2021

(65) Prior Publication Data
US 2022/0397380 A1    Dec. 15, 2022

(30) Foreign Application Priority Data
Nov. 12, 2019  (JP) .................. 2019-204835

(51) Int. Cl.
*G01C 5/00*        (2006.01)
*G01B 5/00*        (2006.01)
(52) U.S. Cl.
CPC .................. *G01B 5/0014* (2013.01)

(58) Field of Classification Search
CPC ................ G01B 7/023; G01B 5/0014
(Continued)

(56) References Cited

U.S. PATENT DOCUMENTS 4,030,027 A * 6/1977 Yamada ................ G01B 7/023
324/207.16
4,737,698 A   4/1988 McMullin et al.
(Continued)

FOREIGN PATENT DOCUMENTS

CN      1223399     7/1999
CN    102822632    12/2012
(Continued)

OTHER PUBLICATIONS

International Search Report issued Dec. 28, 2020 in International Application No. PCT/JP2020/040762 with English translation.
(Continued)

*Primary Examiner* — George B Bennett
*Assistant Examiner* — G. Bradley Bennett
(74) *Attorney, Agent, or Firm* — Wenderoth, Lind & Ponack, L.L.P.

(57) ABSTRACT

A displacement sensor includes a coil which is mounted on a board and which is formed to have less than one turn, an inverter electrically connected to the coil, the inverter being configured to generate an oscillation signal, and a frequency detector electrically connected to the inverter, the frequency detector being configured to detect an oscillation frequency of an oscillator circuit including the coil and the inverter in accordance with a distance between a measurement object and the coil.

12 Claims, 17 Drawing Sheets

(58) Field of Classification Search
USPC .......................................................... 33/702
See application file for complete search history.

(56) References Cited

U.S. PATENT DOCUMENTS

| | | | | |
|---|---|---|---|---|
| 4,875,007 | A * | 10/1989 | Ginns | G01B 7/023 |
| | | | | 324/227 |
| 5,541,510 | A * | 7/1996 | Danielson | G01B 7/10 |
| | | | | 324/207.16 |
| 5,740,616 | A * | 4/1998 | Seddon | G01D 3/02 |
| | | | | 33/554 |
| 5,760,688 | A | 6/1998 | Kasai | |
| 6,160,395 | A * | 12/2000 | Goetz | G01B 7/023 |
| | | | | 324/207.21 |
| 8,258,777 | B2 * | 9/2012 | Chen | G01B 7/023 |
| | | | | 324/207.16 |
| 9,175,941 | B2 * | 11/2015 | Giroud | H03K 17/9505 |
| 9,817,146 | B2 * | 11/2017 | Reime | G01B 7/14 |
| 11,150,110 | B2 * | 10/2021 | Cadugan | G01B 7/023 |
| 2001/0052771 | A1 | 12/2001 | Jagiella | |
| 2008/0197835 | A1* | 8/2008 | Reime | G01B 7/023 |
| | | | | 702/176 |
| 2009/0207404 | A1 | 8/2009 | Tamayo De Miguel et al. | |
| 2013/0021023 | A1 | 1/2013 | Niwa et al. | |
| 2014/0002061 | A1* | 1/2014 | Giroud | G01B 7/14 |
| | | | | 324/202 |
| 2017/0370694 | A1 | 12/2017 | Yoshida et al. | |
| 2020/0333203 | A1* | 10/2020 | Cadugan | G01L 9/10 |

FOREIGN PATENT DOCUMENTS

| | | |
|---|---|---|
| JP | 61-159101 | 7/1986 |
| JP | 05-027045 | 2/1993 |
| JP | 06-317489 | 11/1994 |
| JP | 09-046205 | 2/1997 |
| JP | 2002-022402 | 1/2002 |
| JP | 2009-192385 | 8/2009 |
| JP | 2011-179914 | 9/2011 |
| JP | 2018-141722 | 9/2018 |
| WO | 2005/040556 | 5/2005 |
| WO | 2017/086200 | 5/2017 |

OTHER PUBLICATIONS

Office Action issued Feb. 29, 2024 in corresponding CN Application No. 202080070793.8, with translation of Search Report.

Notice of Allowance issued Jul. 1, 2024 in Chinese Patent Application No. 202080070793.8 with English translation of Search Report.

Zha Anhu, "Subminiature Eddy-Current Speed-Measuring Sensor", Journal of Projectiles, Rockets, Missiles and Guidance, Issue No. 4, Dec. 30, 1988, pp. 87-91.

* cited by examiner

DISTANCE BETWEEN COIL 22 AND MEASUREMENT OBJECT [$\mu$m]

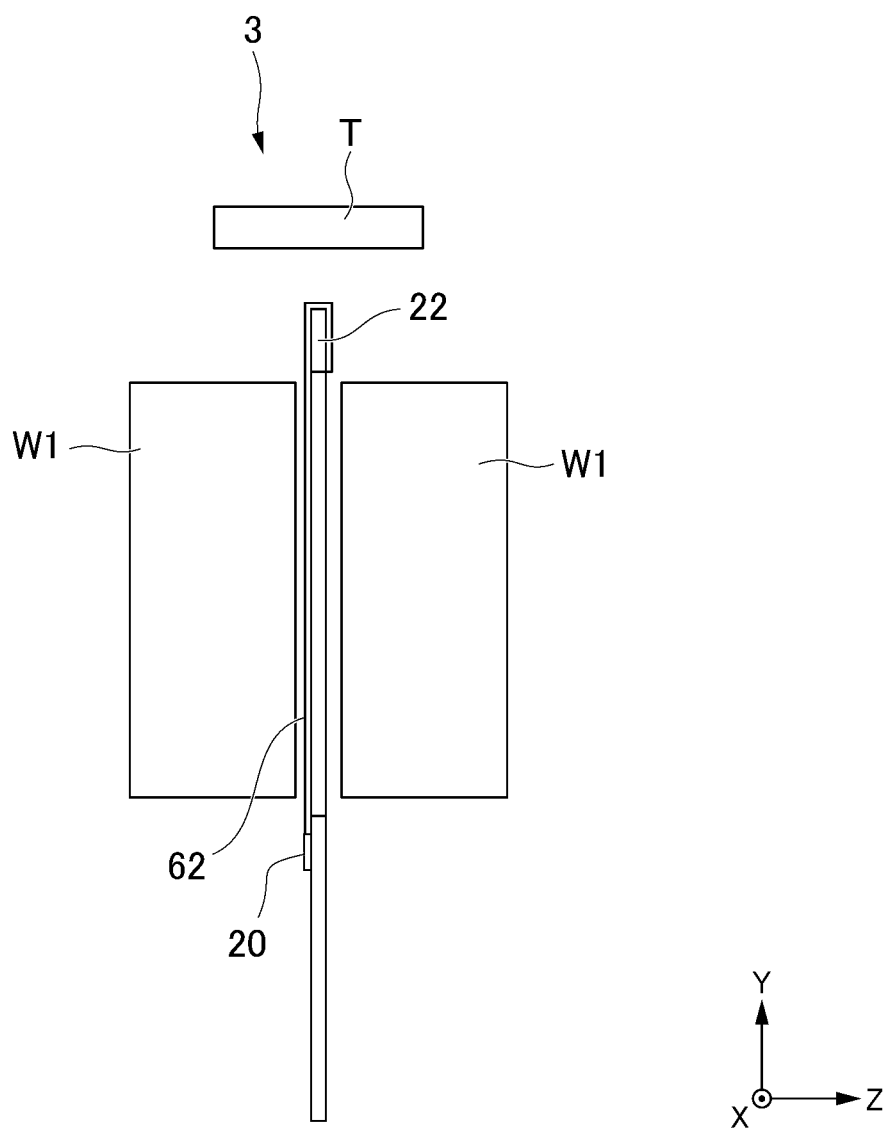

DISTANCE BETWEEN FIRST COIL 72
AND MEASUREMENT OBJECT T5

DISTANCE BETWEEN FIRST COIL 72
AND MEASUREMENT OBJECT T5

DISPLACEMENT SENSOR AND DISPLACEMENT SENSOR SYSTEM

TECHNICAL FIELD

The present invention relates to a displacement sensor and a displacement sensor system for measuring a distance to a measurement object.

Priority is claimed on Japanese Patent Application No. 2019-204835, filed Nov. 12, 2019, the content of which is incorporated herein by reference.

BACKGROUND ART

Regarding a displacement sensor for measuring a distance to a measurement object such as a metal, a displacement sensor using an oscillator circuit is known. In this displacement sensor, the oscillator circuit and an integration circuit are mounted on a board having a coil. In this displacement sensor, since an oscillation frequency of the oscillator circuit changes in accordance with change in a distance between the coil and a measurement object, the distance to a measurement object is measured by detecting this oscillation frequency.

In such a displacement sensor in the related art, for example, a coil provided on a board is a round spiral coil formed to have a planar shape on the board. In the displacement sensor in the related art, it is difficult to achieve miniaturization in order to secure the number of windings of a coil.

CITATION LIST

Patent Literature

[Patent Literature 1]
  Japanese Unexamined Patent Application, First Publication No. 2009-192385

SUMMARY OF INVENTION

Technical Problem to be Solved by the Invention

A problem to be resolved by the present invention is to provide a displacement sensor and a displacement sensor system in which miniaturization can be achieved.

Means for Solving the Problem

One aspect of the present invention provides a displacement sensor including a coil which is mounted on a board and which is formed to have less than one turn, an inverter electrically connected to the coil, the inverter being configured to generate an oscillation signal, and a frequency detector electrically connected to the inverter, the frequency detector being configure to detect an oscillation frequency of an oscillator circuit including the coil and the inverter in accordance with a distance between a measurement object and the coil.

In one aspect of the present invention, a lead wire may be connected to the coil. The coil and the lead wire may be formed to have less than one turn.

In one aspect of the present invention, the board may include a component disposition portion on which the inverter and the frequency detector are provided, and a coil mounting portion which protrudes from a part of the component disposition portion and on which the coil is mounted.

In one aspect of the present invention, the coil may be disposed along an end portion of a coil mounting portion on which the coil is mounted.

In one aspect of the present invention, the coil may be disposed on a board side surface of a coil mounting portion on which the coil is mounted.

In one aspect of the present invention, the coil may include horizontal portions which are respectively disposed on both surfaces of an end portion of the coil mounting portion, and a vertical portion which connects the horizontal portions to each other and is disposed along the board side surface.

In one aspect of the present invention, the coil mounting portion may have a shape with a length in a first direction protruding from the component disposition portion and a length in a second direction orthogonal to the first direction. The length of the coil mounting portion in the first direction may be longer than the length in the second direction.

In one aspect of the present invention, a passing-through hole through which the measurement object passes at a time of measurement may be formed in the board. The coil may be disposed on an inner surface of the passing-through hole.

In one aspect of the present invention, a cutout portion may be formed at one side of the board. The coil may be disposed on an inner surface of the cutout portion.

In one aspect of the present invention, in the board, a passing-through hole through which the measurement object passes at a time of measurement, and a cutout portion which is formed by cutting out between the passing-through hole and one side of the board may be formed. The coil may be disposed on an inner surface of the passing-through hole.

In one aspect of the present invention, the board may include a first board and a second board which is combined with the first board. A first cutout portion may be formed at one side of the first board, and a second cutout portion may be formed at one side of the second board. When the first board and the second board are arranged at positions where the first cutout portion and the second cutout portion face each other, a passing-through hole through which the measurement object passes at a time of measurement may be formed because of the first cutout and the second cutout portion. The coil may be disposed along at least one of an inner surface of the first cutout portion and an inner surface of the second cutout.

Another aspect of the present invention provides a displacement sensor system including a first coil which is mounted on a first board and which is formed to have less than one turn, a second coil which is mounted on a second board and which is formed to have less than one turn, a first inverter electrically connected to the first coil, the first inverter being configured to generate an oscillation signal, a second inverter electrically connected to the second coil, the second inverter being configured to generate an oscillation signal, a first frequency detector which is a frequency detector electrically connected to the first inverter, the first frequency detector being configured to detect an oscillation frequency of an oscillator circuit including the first coil and the first inverter in accordance with a distance between a measurement object disposed between the first coil and the second coil facing each other and the first coil, a second frequency detector which is a frequency detector electrically connected to the second inverter, the second frequency detector being configured to detect an oscillation frequency of an oscillator circuit including the second coil and the second inverter in accordance with a distance between the measurement object and the second coil, and a measure configured to measure displacement of the measurement object on the basis of an oscillation frequency detected by the first frequency detector and an oscillation frequency detected by the second frequency detector.

Effect of the Invention

According to one aspect of the present invention, it is possible to provide a displacement sensor and a displacement sensor system in which miniaturization can be achieved.

BRIEF DESCRIPTION OF DRAWINGS

FIG. 8B is a view of the displacement sensor 3 according to the third embodiment viewed from a lateral side.

DESCRIPTION OF EMBODIMENTS

Hereinafter, a displacement sensor and a displacement sensor system according to some embodiments of the present invention will be described with reference to the drawings.

First Embodiment

Figure 1:
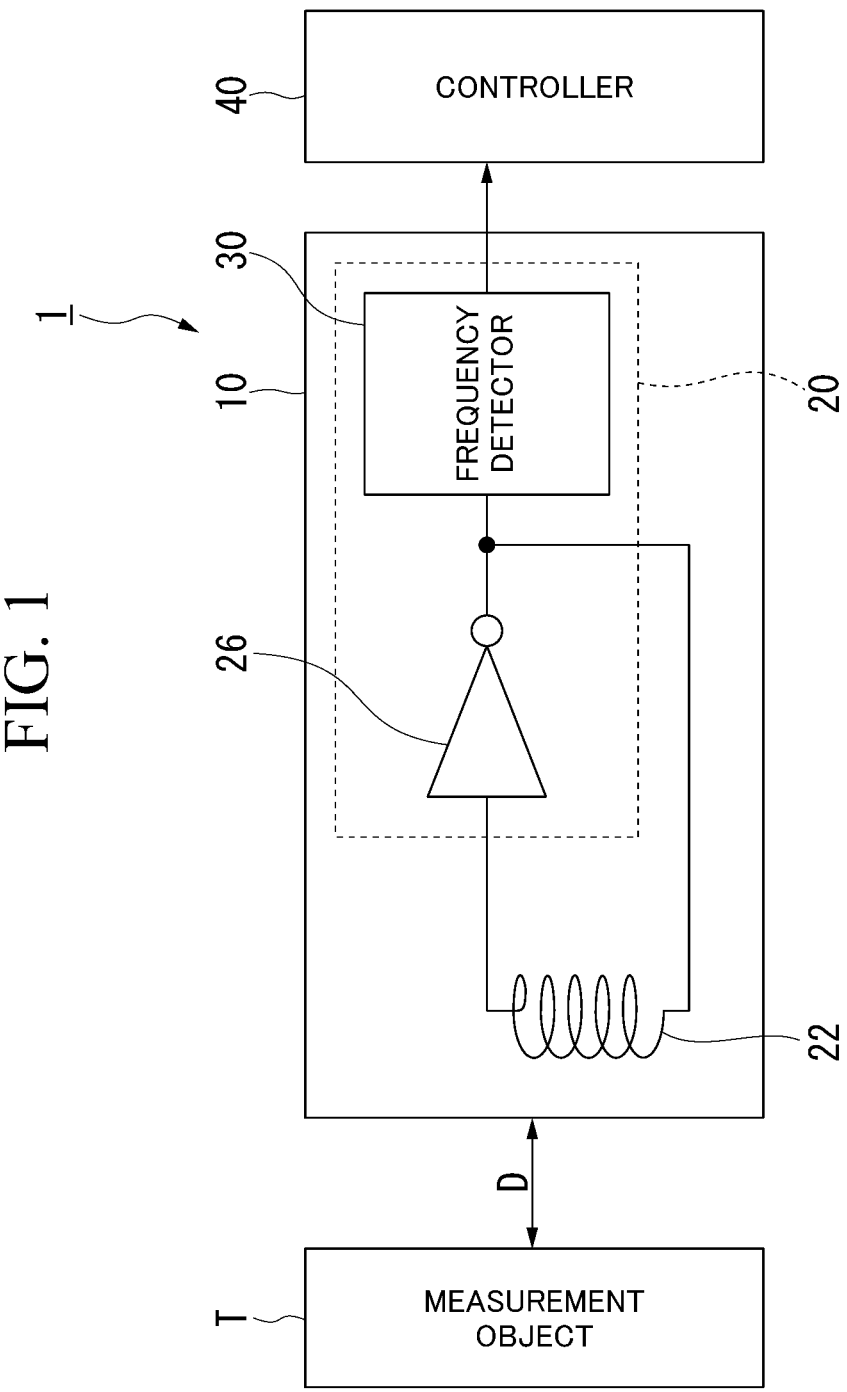
FIG. 1 is a block diagram showing an example of a configuration of a displacement sensor 1 according to a first embodiment.

First, a displacement sensor 1 according to a first embodiment will be described. FIG. 1 is a block diagram showing an example of a configuration of the displacement sensor 1 according to the first embodiment. For example, the displacement sensor 1 includes a board 10, a coil 22, an inverter 26, and a frequency detector 30. Electronic components such as the coil 22, the inverter 26, and the frequency detector 30 are provided on the board 10. The board 10 is further provided with electronic components such as a capacitor, a connector, and a buffer (not shown). The displacement sensor 1 measures a distance D between a measurement object T (an electric conductor such as a metal) and the displacement sensor 1 and outputs a measurement result to an external controller 40 or the like. The coil 22 and the inverter 26 form a loop circuit and function as an oscillator circuit.

For example, the board 10 is formed using a glass board, an epoxy-based board (a glass epoxy board, a paper epoxy board, or the like), a polyimide board, a ceramic board, or the like.

The coil 22 is disposed on the board 10. The displacement sensor 1 measures the distance D between the coil 22 and the measurement object T. For example, an oscillation frequency of the oscillator circuit is 30 MHz or higher. For example, the oscillation frequency of the oscillator circuit is approximately 100 to 500 MHz. The frequency of the oscillator circuit may be a higher frequency, for example, 800 MHz to 2 GHz. For example, a material of the coil 22 is Ag, Cu, Au, or the like. In addition, an outer surface of the coil 22 may be covered with a protective film in order to prevent contamination from the outside, oxidation, and the like.

The inverter 26 generates an oscillation signal for causing the coil 22 to oscillate at a high frequency. For example, the inverter 26 is a CMOS inverter. An input end of the inverter 26 is electrically connected to the coil 22. The inverter 26 causes the coil 22 to oscillate by performing an operation of outputting a Hi signal when a Lo signal is input and outputting the Lo signal when the Hi signal is input.

The frequency detector 30 detects the oscillation frequency of the oscillator circuit which changes in accordance with the distance between the measurement object T and the coil 22. The frequency detector 30 is electrically connected to the inverter 26. The frequency detector 30 outputs a value (count value) indicating the detected oscillation frequency to the controller 40 which is an external device. In addition, the frequency detector 30 may output a value, which is obtained by converting the value indicating the detected oscillation frequency into the distance D between the measurement object T and the coil 22, to the controller 40. The controller 40 may be embedded into the displacement sensor 1.

For example, the frequency detector 30 includes a frequency counter and an output. The frequency counter detects the oscillation frequency of the oscillator circuit in accordance with the distance between the measurement object T and the coil 22. A measurement time during which the frequency counter counts the frequency can be set in advance in accordance with the purpose. A resolution of the displacement sensor 1 can be enhanced by lengthening the measurement time. For example, the measurement time is 100 μs, 200 μs, 300 μs, 400 μs, or the like. The output outputs a value indicating the oscillation frequency detected by the frequency counter to the controller 40 as a digital signal.

In the first embodiment, the inverter 26 and the frequency detector 30 are mounted on the board 10 as hardware such as an integrated circuit (IC) 20. The coil 22 is disposed outside the IC 20. The inverter 26 and the frequency detector 30 may be provided on the board 10 in a manner other than hardware such as the IC 20.

The controller 40 converts a value indicating the oscillation frequency input from the frequency detector 30 into the distance D between the measurement object T and the coil 22 and displays the result. For example, the controller 40 is a personal computer or a terminal device such as a portable telephone. In addition, in a case or the like in which the frequency detector 30 outputs a value converted into the distance D between the measurement object T and the coil 22 to the controller 40, the controller 40 may be a liquid crystal display, an organic electroluminescence (EL) display device, or the like.

Figure 2A:
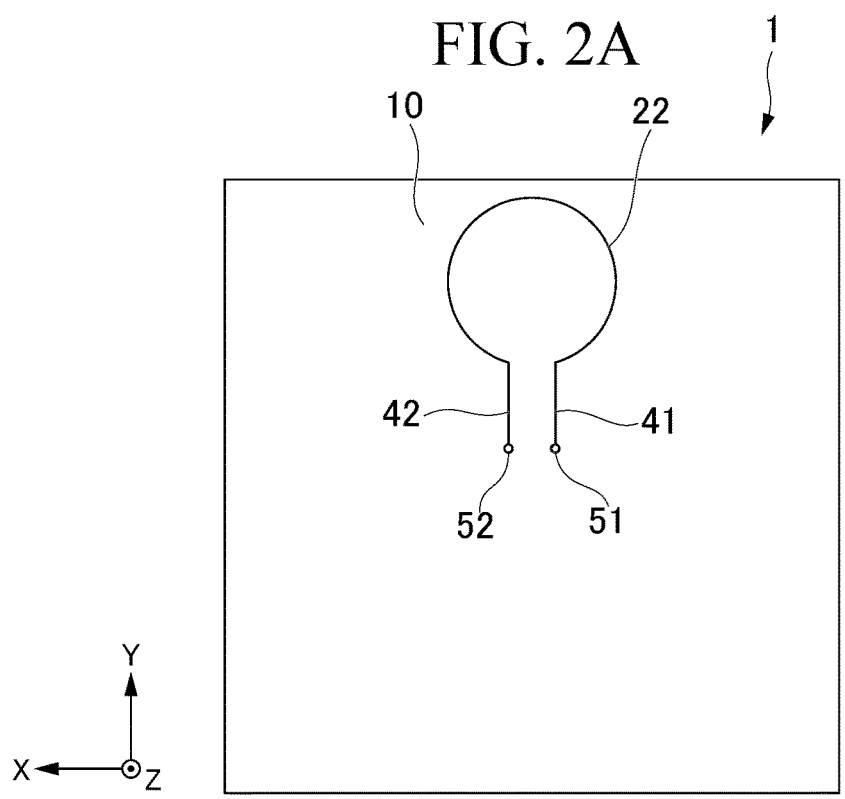
FIG. 2A is a view of the displacement sensor 1 according to the first embodiment viewed from a first surface side.
Figure 2B:
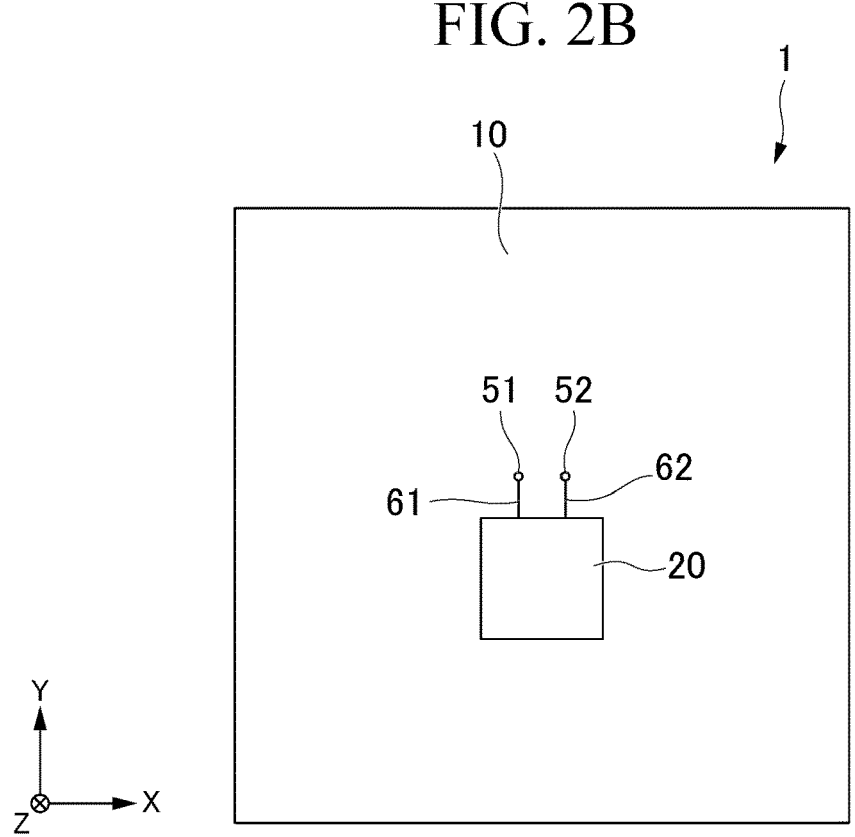
FIG. 2B is a view of the displacement sensor 1 according to the first embodiment viewed from a second surface side.
Figure 2C:
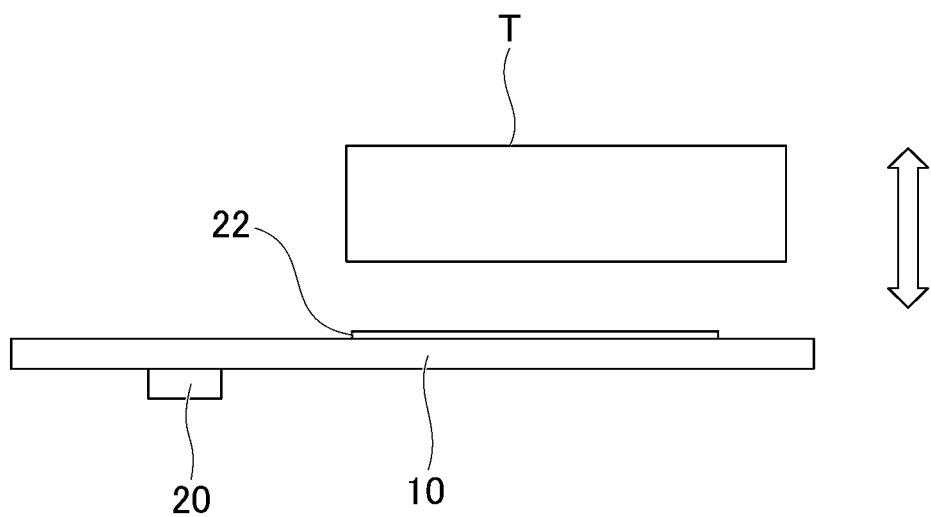
FIG. 2C is a view of the displacement sensor 1 according to the first embodiment viewed from a side surface.

Next, mounting of electronic components on the board 10 will be described. FIG. 2A is a view of the displacement sensor 1 according to the first embodiment viewed from a first surface side, and FIG. 2B is a view of the displacement sensor 1 according to the first embodiment viewed from a second surface side. In the following description, a direction along an axis of the coil 22 will be described as a Z direction, and two directions orthogonal to each other in a plane intersecting, for example, orthogonal to the X direction will be described as an X direction and a Y direction, respectively. The Y direction is an example of "a first direction", and the X direction is an example of "a second direction".

As shown in FIG. 2A, the board 10 has a rectangular shape. The board 10 may have a shape other than a rectangular shape. For example, it may have a shape such as a square shape, a circular shape, and an oval shape. The coil 22 is mounted by being disposed on a first surface that is a surface of the board 10 on one side. The coil 22 is formed to have less than one turn. Specifically, the coil 22 is formed to have less than one turn on the board 10 in a shape of which a part of the circular shape is cut out.

The coil 22 may be formed on the first surface or a second surface of the board 10. The coil 22 may be provided along an inclined surface provided so as to be inclined on an outer surface of the board 10. Since the coil 22 is formed to have less than one turn, it has a shape with no overlapping part. Although the coil 22 is formed to have less than one turn, it may have a shape other than a shape drawing an arc. For example, it may be formed to have one turn by cutting out a part of a polygonal shape such as a triangular shape, a quadrangular shape, a pentagonal shape, and a hexagonal shape; a regular polygonal shape; an oval shape; and an elliptical shape or by forming a waved shape or a pulsed shape. The coil 22 may have a shape in which an arc and a straight line are mixed.

A first lead wire 41 on the first surface side disposed on the first surface of the board 10 and a second lead wire 42 on the first surface side are respectively connected to one end and the other end of the coil 22. A first through hole 51 and a second through hole 52 are provided side by side on a lower side of the coil 22. The first through hole 51 and the second through hole 52 penetrate the board 10 and are respectively provided across the first surface and the second surface of the board 10 facing the first surface. Both ends of the coil 22 are respectively connected to vias provided in the first through hole 51 and the second through hole 52 through the first lead wire 41 on the first surface side and the second lead wire 42 on the first surface side. Both ends of the coil 22 may be directly connected to the vias provided in the first through hole 51 and the second through hole 52 without going through the lead wires.

As shown in FIG. 2B, the IC 20 is mounted on the second surface of the board 10. A first lead wire 61 on the second surface side and a second lead wire 62 on the second surface side are connected to the IC 20. The first lead wire 61 on the second surface side is connected to the first lead wire 41 on the first surface side through the via provided in the first through hole 51. The second lead wire 62 on the second surface side is connected to the second lead wire 42 on the first surface side through the via provided in the second through hole 52. For example, the capacitor, the connector, the buffer, and the like are mounted on the second surface of the board 10.

In the displacement sensor 1 according to the first embodiment, the coil 22 is formed to have less than one turn. For this reason, the number of windings of the coil 22 can be reduced. Therefore, miniaturization can be achieved.

In addition, in the displacement sensor 1 according to the first embodiment, since the coil 22 is formed to have less than one turn, the coil 22 can be made shorter than when it is formed to have a plurality of turns. Therefore, the coil 22 can be easily manufactured, and room for occurrence of a manufacturing defect such as disconnection or a short circuit can be reduced. In addition, in the displacement sensor 1 according to the first embodiment, since the coil 22 is formed on the outer surface of the board 10, displacement of a measurement object in the Z direction can be detected with a high sensitivity at a position separated in the Z direction with respect to the board 10. In addition, since the coil 22 is formed to have less than one turn, it can be easily provided at various places in the board.

Figure 3:
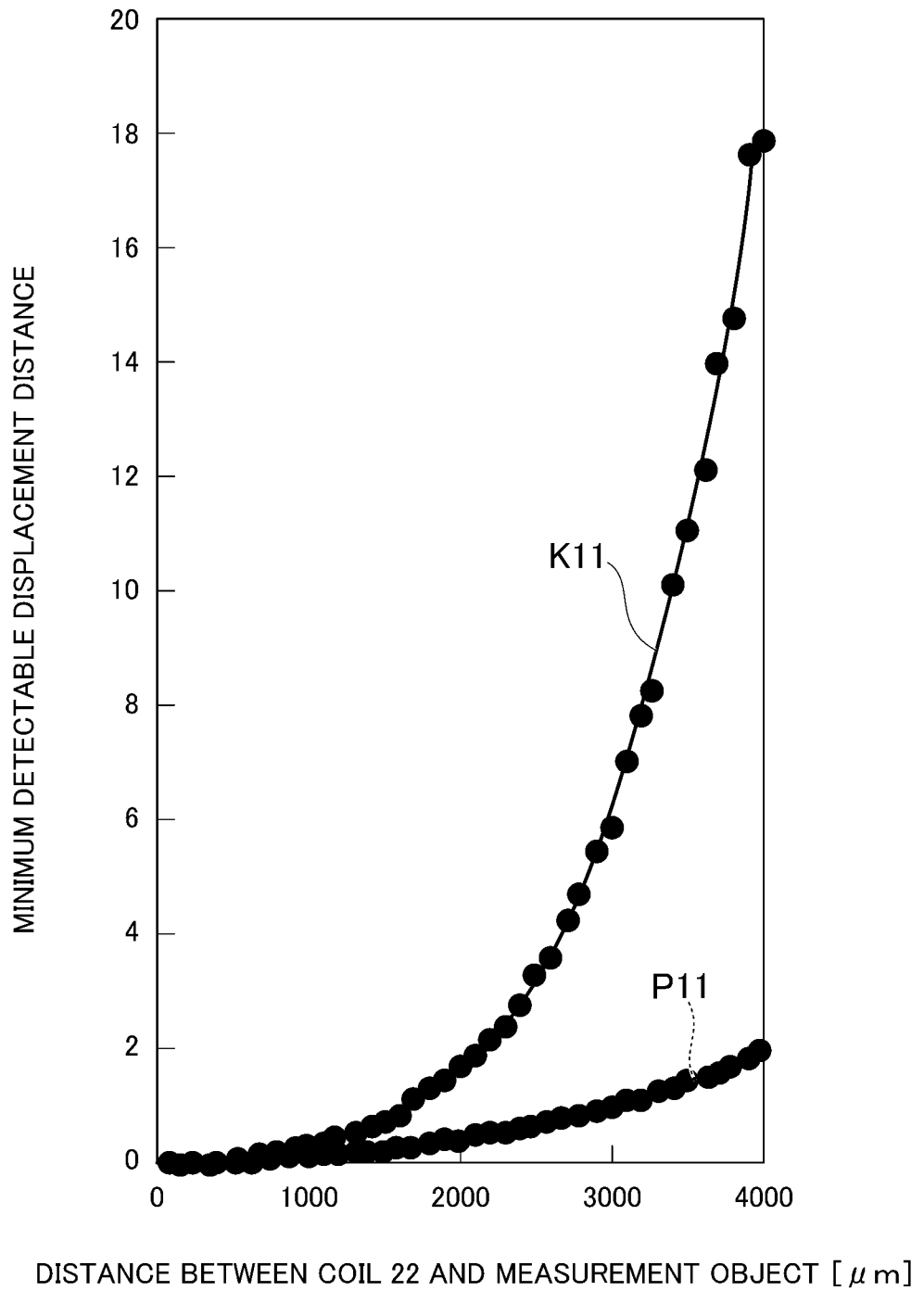
FIG. 3 is a graph for describing a detection sensitivity of the displacement sensor 1 according to the first embodiment.

FIG. 3 is a graph for describing a detection sensitivity of the displacement sensor 1 according to the first embodiment. In FIG. 3, the horizontal axis indicates a distance between the coil 22 and the measurement object, and the vertical axis indicates a minimum detectable displacement distance (resolution). The minimum detectable displacement distance indicates a minimum distance of displacement which can be detected per 100 μs, and the detection sensitivity increases when the minimum detectable distance becomes shorter. In FIG. 3, a first graph K11 in the related art indicates a relationship between the minimum detectable displacement distance and the distance between the coil and the measurement object in a displacement sensor in the related art, and a graph P11 according to the first embodiment indicates a relationship between the minimum detectable displacement distance and the distance between the coil 22 and the measurement object in the displacement sensor 1. In addition, the graphs shown in FIG. 3 indicate a relationship regarding the distance in the Z direction. The displacement sensor in the related art is a displacement sensor including a coil which is wound a plurality of turns.

As seen from the change in the first graph K11 in the related art, in the displacement sensor in the related art, a ratio of the minimum detectable displacement distance which is lengthened when the distance between the coil and the measurement object is lengthened becomes larger than that in the displacement sensor 1. Particularly, the ratio of the minimum detectable displacement distance being lengthened steeply increases from a section where the distance between the coil and the measurement object exceeds 1,500 μm. On the other hand, as seen from the graph P11 according to the first embodiment, in the displacement sensor 1, when the distance between the coil 22 and the measurement object is lengthened, the minimum detectable displacement distance also increases gradually, but the ratio of the minimum detectable displacement distance being increased seldom changes. As a result, when the distance between the coil 22 and the measurement object is long, the difference in the minimum detectable displacement distance increases between the displacement sensor in the related art and the displacement sensor 1. From this result, it is ascertained that the displacement sensor 1 has a high detection sensitivity compared to the displacement sensor in the related art.

Common Elements in Second to Seventh Embodiments

Figure 4A:
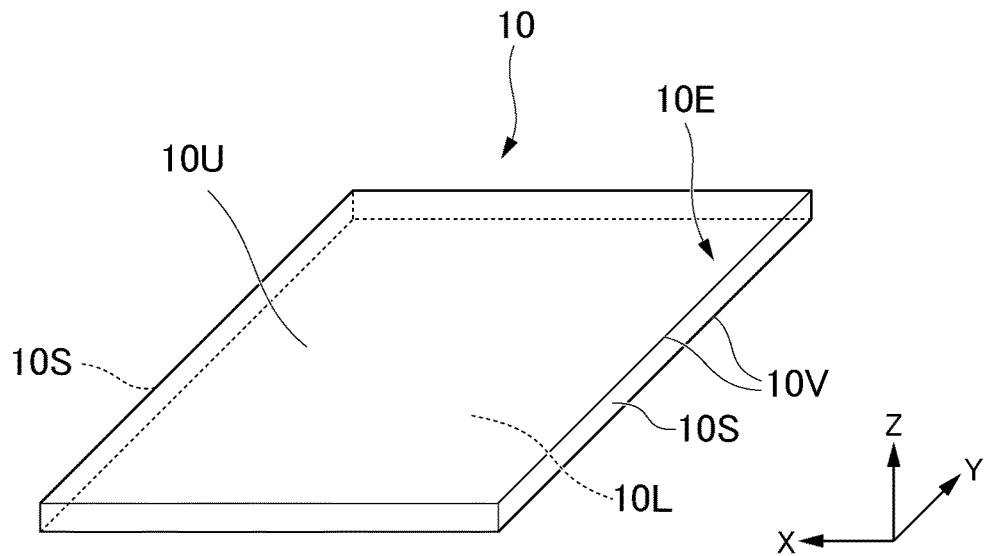
FIG. 4A is a view showing an overview of a board 10 for describing common elements in a second embodiment to a seventh embodiment.

Hereinafter, in addition to the first embodiment, a second embodiment to an eighth embodiment will be described successively. Before each of the embodiments is described successively, common elements in the second embodiment to the seventh embodiment will be described. FIG. 4A is a view showing an overview of the board 10 for describing common elements in the second embodiment to the seventh embodiment. As shown in FIG. 4A, the board 10 related to description of the common elements has a square shape in a plan view and includes a first surface 10U, a second surface 10L, and a board side surface 10S. The board 10 further includes an end side 10V at an end portion 10E of the board 10. The end side 10V is a line (side) at a transition between the first surface 10U or the second surface 10L of the board 10 and the board side surface 10S. For example, when a penetration hole penetrating the first surface 10U and the second surface 10L is formed on an inner side of the board 10, the board side surface may be a side surface of the penetration hole on the inner side of the board.

The coil 22 is mounted at the end portion 10E of the board 10. The coil 22 provided at the end portion 10E of the board 10 may come into contact with the end side 10V or may be separated from the end side 10V. The coil 22 is formed to have one turn at the end portion 10E of the board 10. However, in each of the following embodiments, parts corresponding to the end portion 10E of the board 10 differ from each other. A coil mounting portion 12 (refer to FIG. 5) of the board 10 may be attached, a passing-through hole 14 (refer to FIG. 9) may be formed, or a cutout portion 15 (refer to FIG. 11A) may be formed, and these end portions correspond to the end portion 10E of the board 10. For this reason, description for a specific form of forming the coil 22 is entrusted to each of the embodiments.

The board 10 may have a shape other than a square shape. It may have a quadrangular shape such as a rectangular shape or a polygonal shape such as a pentagonal shape or a hexagonal shape. Moreover, it may have a circular shape, an oval shape, an elliptical shape, or a shape in which these shapes are combined. In the board 10, the first through hole 51 and the second through hole 52 penetrating the board 10 are provided across the first surface 10U and the second surface 10L of the board 10. Similarly to the first embodiment, the IC 20 (refer to FIG. 2B) is provided on the second surface 10L of the board 10.

Figure 4B:
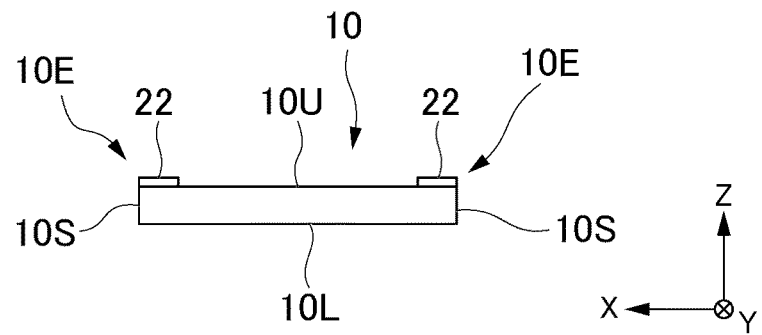
FIG. 4B is a cross-sectional view for describing a coil 22 mounted on the board 10.
Figure 4C:
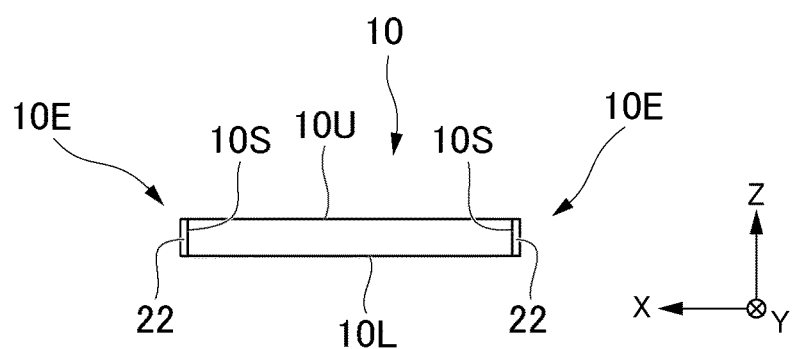
FIG. 4C is a cross-sectional view for describing the coil 22 mounted on the board 10.

FIGS. 4B to 4E are cross-sectional views for describing the coil 22 mounted on the board 10. The coil 22 mounted on the board 10 may be provided on the first surface 10U of the board 10 as shown in FIG. 4B or may be provided on the board side surface 10S of the board 10 as shown in FIG. 4C. In addition, although it is not shown, the coil 22 may be provided on the second surface 10L of the board 10.

Figure 4D:
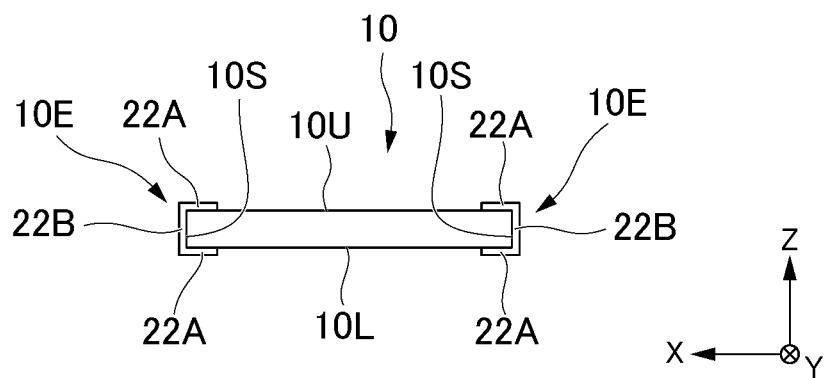
FIG. 4D is a cross-sectional view for describing the coil 22 mounted on the board 10.

In addition, the coil 22 may include horizontal portions which are respectively disposed at end portions on both surfaces of the board 10, and a vertical portion which connects the horizontal portions to each other and which is disposed along the board side surface. Specifically, as shown in FIG. 4D, the coil 22 may include horizontal portions 22A which are respectively disposed on the first surface 10U and the second surface 10L at the end portion 10E of the board 10, and a vertical portion 22B which connects the horizontal portions 22A to each other and which is disposed along the board side surface 10S, and may have a U-shaped cross section. The vertical portion 22B is disposed on the board side surface 10S of the board 10. In this manner, the coil 22 may be provided with the end portion 10E of the board 10 sandwiched therebetween. The vertical portion 22B may have the same width as the width of the board side surface 10S (a thickness of the board 10) or may have a width smaller than the width of the board side surface 10S. Widths of the horizontal portions 22A are narrower (shorter) than the width of the vertical portion 22B but may be wider (longer) than the width of the vertical portion 22B.

Figure 4E:
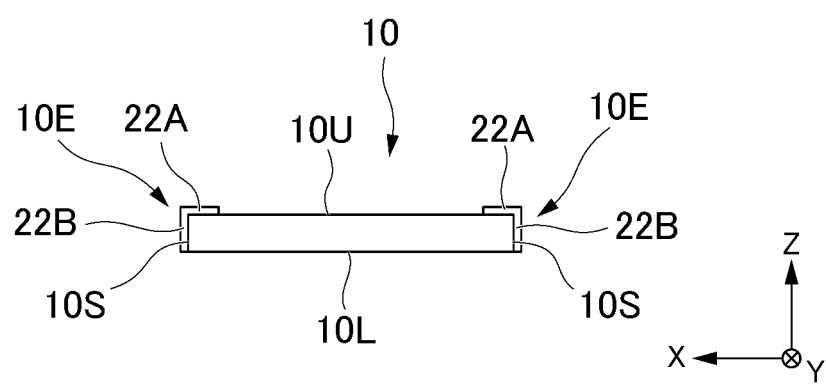
FIG. 4E is a cross-sectional view for describing the coil 22 mounted on the board 10.

In addition, as shown in FIG. 4E, the coil 22 may be provided so as to have substantially an L-shaped cross section on the first surface 10U and the board side surface 10S of the board 10. In addition, although it is not shown, the coil 22 may be provided so as to have substantially an L-shaped cross section on the second surface and the board side surface of the board 10.

When the coil 22 is provided on the first surface 10U of the board 10, displacement of the measurement object in the Z direction can be detected with a high sensitivity at a position separated in the Z direction with respect to the board 10. When the coil 22 is provided on the board side surface 10S of the board 10, displacement of the measurement object in each of the X direction and the Y direction can also be detected with a high sensitivity at a position separated in the X direction or the Y direction with respect to the board 10.

For further description in this regard, in a coil which is formed to have a plurality of turns, a part of turns on an outer side is likely to approach the measurement object in an XY direction, but a part of turns on an inner side is unlikely to approach the measurement object. Therefore, from a viewpoint of the coil in its entirety, there are a part which is likely to approach the measurement object and a part which is unlikely to approach the measurement object in the XY direction.

In contrast, since the coil 22 is formed to have less than one turn, there is no part which is unlikely to approach the measurement object in the XY direction in the coil 22 in its entirety. Therefore, displacement of the measurement object in each of the X direction and the Y direction can also be detected with a high sensitivity at a position separated in the X direction or the Y direction with respect to the board 10.

In addition, the coil 22 is formed to have less than one turn. For this reason, the number of windings of the coil 22 can be reduced. Therefore, miniaturization can be achieved, and a manufacturing defect such as disconnection or a short circuit can be prevented. The coil 22 and the lead wires 61 and 62 may be provided so as to have less than one turn together. Accordingly, even if the lead wires do not pass through the through holes, the coil 22 and the IC 20 can be connected to each other, and thus further miniaturization can be achieved.

Second Embodiment

Figure 5:
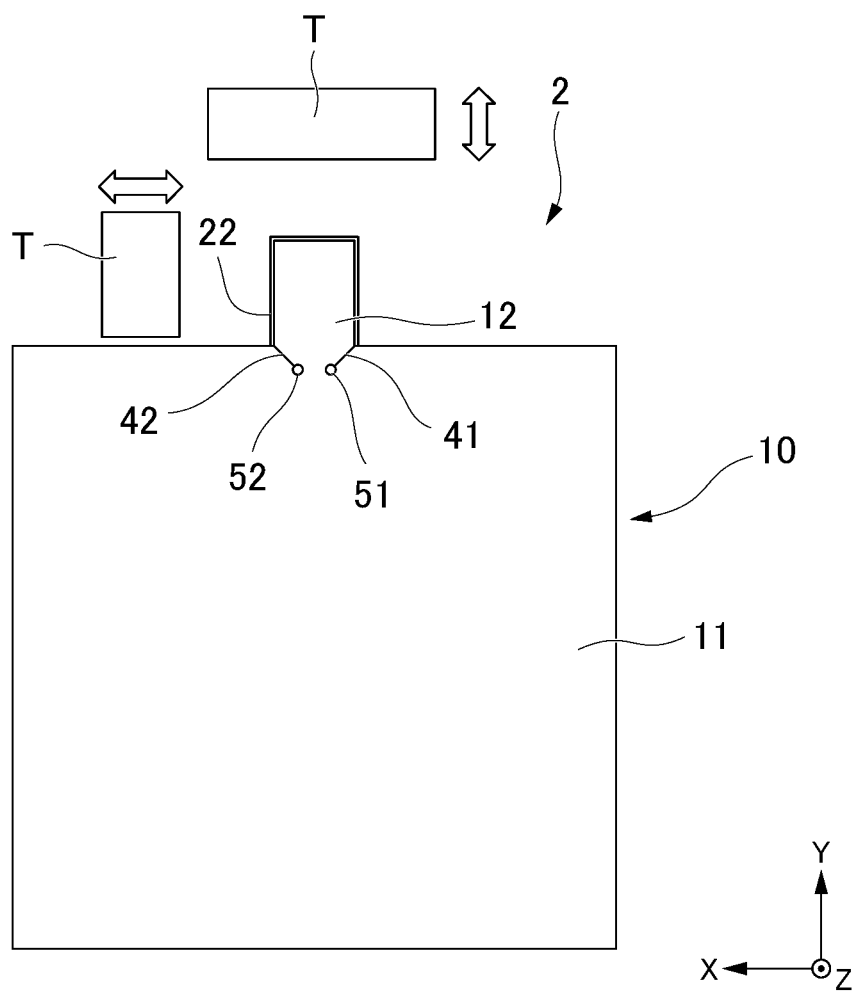
FIG. 5 is a view of a displacement sensor 2 according to the second embodiment viewed from the first surface side.

Next, a displacement sensor 2 according to the second embodiment will be described. FIG. 5 is a view of the displacement sensor 2 according to the second embodiment viewed from the first surface side. As shown in FIG. 5, the board 10 includes a component disposition portion 11 and the coil mounting portion 12. The component disposition portion 11 has a square shape. The component disposition portion 11 may have a shape other than a square shape. It may have a quadrangular shape such as a rectangular shape or a polygonal shape such as a pentagonal shape or a hexagonal shape. Moreover, it may have a circular shape, an oval shape, an elliptical shape, or a shape in which these shapes are combined.

The coil mounting portion 12 is a protrusion portion which is provided so as to protrude in the Y direction from one side of the component disposition portion 11. The coil mounting portion 12 has a square shape smaller than the component disposition portion 11. Similarly to the component disposition portion 11, the coil mounting portion 12 may have a shape other than a square shape. In the coil mounting portion 12, the coil 22 is disposed so as to have less than one turn. The coil 22 has been described in the foregoing common elements.

The coil 22 is provided at an end portion of the coil mounting portion 12 corresponding to the end portion 10E of the board 10 shown in FIG. 4A. The coil 22 may be provided across the whole circumference of the end portion of the coil mounting portion 12, or the coil 22 may be provided at a part of the end portion of the coil mounting portion 12 without extending across the whole circumference so as not to be provided at other parts of the coil mounting portion 12.

The shapes of the component disposition portion 11 and the coil mounting portion 12 may be the same or different from each other. The component disposition portion 11 may be larger or smaller than the coil mounting portion 12. Electronic components and the like may be disposed on the coil mounting portion 12, and the coil 22 may be mounted across the component disposition portion 11.

The displacement sensor 2 according to the second embodiment exhibits operational effects which have been described in the foregoing first embodiment and the common elements in the second to seventh embodiments. In addition, in the displacement sensor 2 according to the second embodiment, since the coil 22 is disposed along an end side of the coil mounting portion 12, displacement of the measurement object T in each of the X direction and the Y direction can also be detected with a high sensitivity at a position separated in the X direction or the Y direction with respect to the board 10.

Figure 6A:
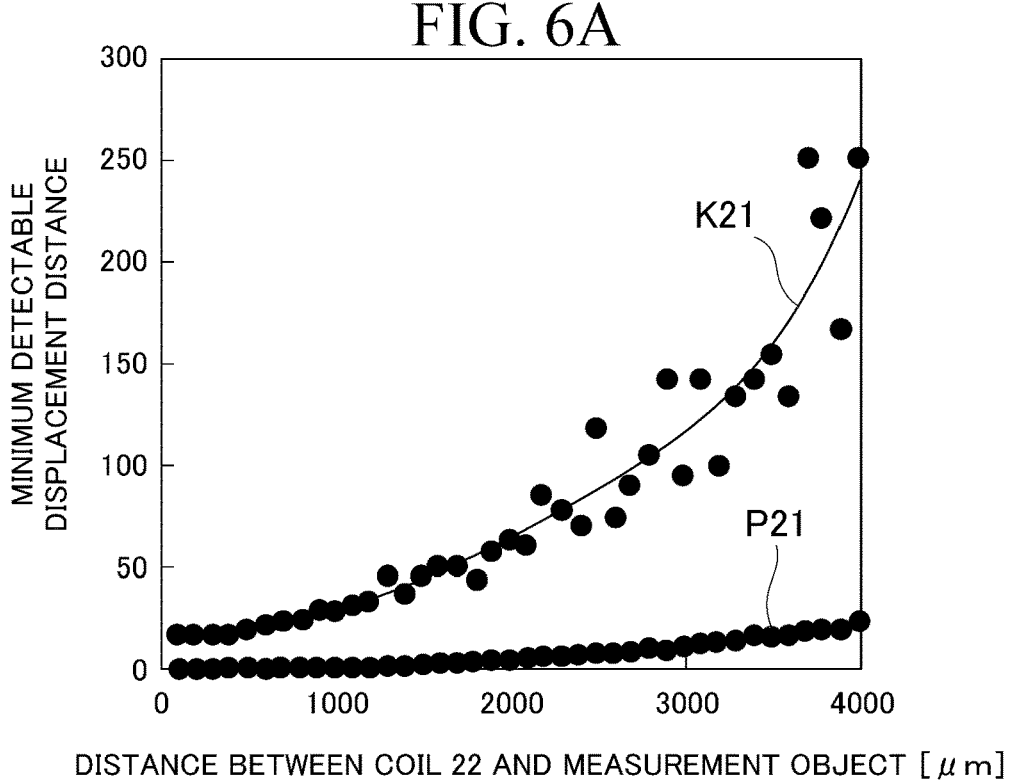
FIG. 6A is a graph for describing a detection sensitivity of the displacement sensor 2 according to the second embodiment.
Figure 6B:
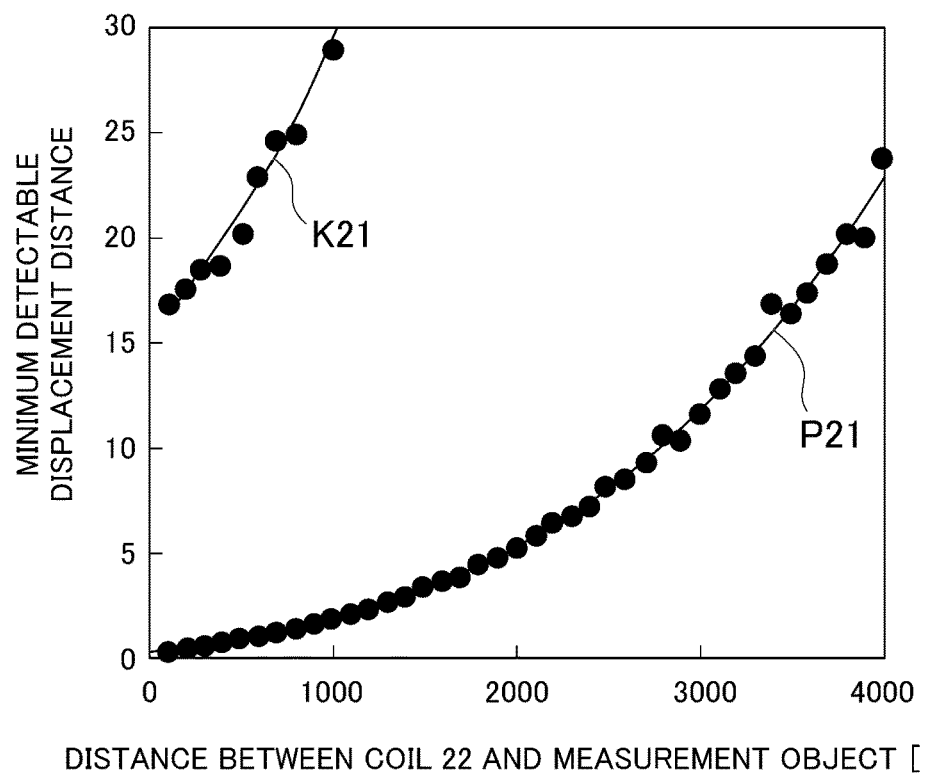
FIG. 6B is a partial enlarged view of FIG. 6A.

FIG. 6A is a graph for describing a detection sensitivity of the displacement sensor 2 according to the second embodiment, and FIG. 6B is a partial enlarged view of FIG. 6A. The graph shown in FIG. 6A is a graph for describing a detection sensitivity regarding an example in which the coil 22 is formed in the coil mounting portion 12 as in FIG. 4B. In FIGS. 6A and 6B, the horizontal axis indicates the distance between the coil 22 and the measurement object T, and the vertical axis indicates the minimum detectable displacement distance. In FIGS. 6A and 6B, a second graph K21 in the related art indicates a relationship between the minimum detectable displacement distance and the distance between the coil and the measurement object in the displacement sensor in the related art, and a graph P21 according to the second embodiment indicates a relationship between the minimum detectable displacement distance and the distance between the coil 22 and the measurement object T in the displacement sensor 2. In addition, the graphs shown in FIGS. 6A and 6B indicate a relationship regarding the distance in the Y direction.

As seen from the change in the second graph K21 in the related art shown in FIG. 6A, in the displacement sensor in the related art, the ratio of the minimum detectable displacement distance which is lengthened when the distance between the coil and the measurement object is lengthened becomes larger than that in the displacement sensor 2. On the other hand, as seen from the graph P21 according to the second embodiment, in the displacement sensor 2, when the distance between the coil 22 and the measurement object T is lengthened, the minimum detectable displacement distance also increases gradually, but the ratio of the minimum detectable displacement distance being increased seldom changes. As a result, when the distance between the coil 22 and the measurement object T is long, the difference in the minimum detectable displacement distance increases between the displacement sensor in the related art and the displacement sensor 2. As shown in FIG. 6B, this tendency becomes pronounced when the distance between the coil 22 and the measurement object T is short. From this result, it is ascertained that the displacement sensor 2 has a high detection sensitivity compared to the displacement sensor in the related art.

Figure 7:
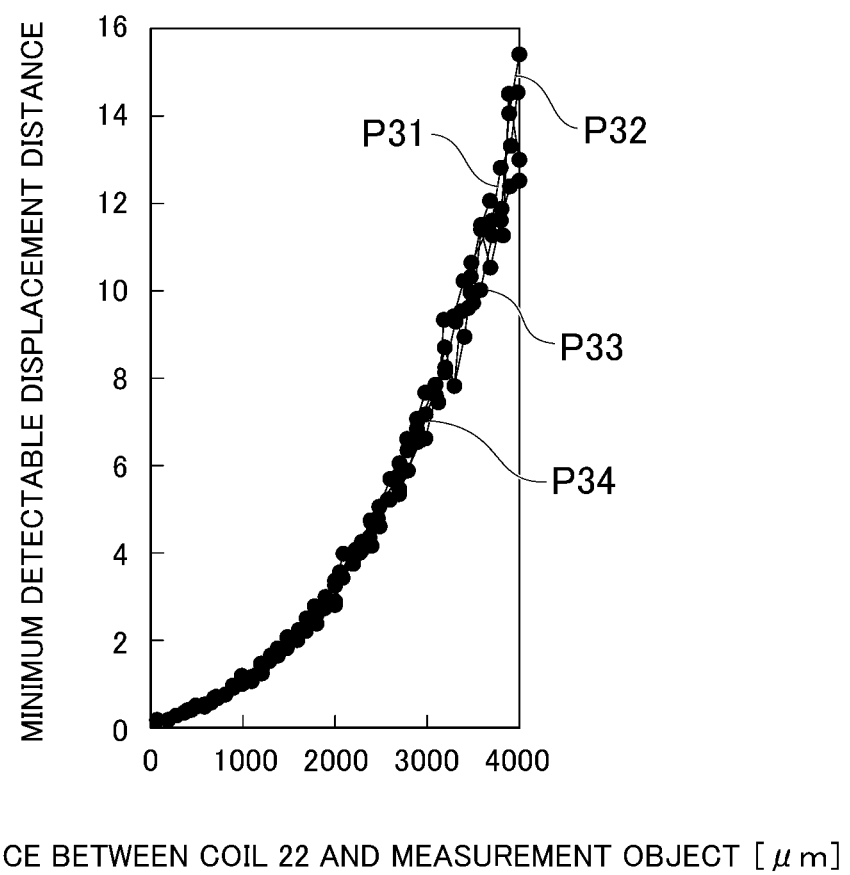
FIG. 7 is a graph for describing a detection sensitivity of the displacement sensor 2 according to the second embodiment.

In addition, FIG. 7 is a graph for describing a detection sensitivity of the displacement sensor 2 according to the second embodiment. The graph shown in FIG. 7 is a graph for describing a detection sensitivity regarding an example in which the coil 22 is formed at a part on the side surface of the coil mounting portion 12 as in FIG. 4D. In FIG. 7, the horizontal axis indicates the distance between the coil 22 and the measurement object, and the vertical axis indicates the minimum detectable displacement distance. In FIG. 7, a graph P31 according to a 2-1st embodiment and a graph P32 according to a 2-2nd embodiment respectively indicate relationships between the minimum detectable displacement distance and the distance between the coil 22 and the measurement object in a first measurement and a second measurement when the measurement object is measured twice by the displacement sensor 2 using the board 10 having a thickness of 300 μm. The thickness of the board 10 corresponds to the wiring width of the coil 22. A graph P33 according to a 2-3rd embodiment and a graph P34 according to a 2-4th embodiment respectively indicate relationships between the minimum detectable displacement distance and the distance between the coil 22 and the measurement object in a first measurement and a second measurement when the measurement object is measured twice by the displacement sensor 2 using the board 10 having a thickness of 600 μm.

As seen from the graph P31 according to the 2-1st embodiment, the graph P32 according to the 2-2nd embodiment, the graph P33 according to the 2-3rd embodiment, and the graph P34 according to the 2-4th embodiment, in both the case of using the board 10 having a thickness of 300 μm and the case of using the board 10 having a thickness of 600 μm, the relationships between the minimum detectable displacement distance and the distance between the coil 22 and the measurement object in the first measurement and the second measurement are approximately similar to each other. From this result, it is ascertained that the distance in the Y direction can be detected with equivalent detection accuracy regardless of the thickness of the board 10.

Third Embodiment

Figure 8A:
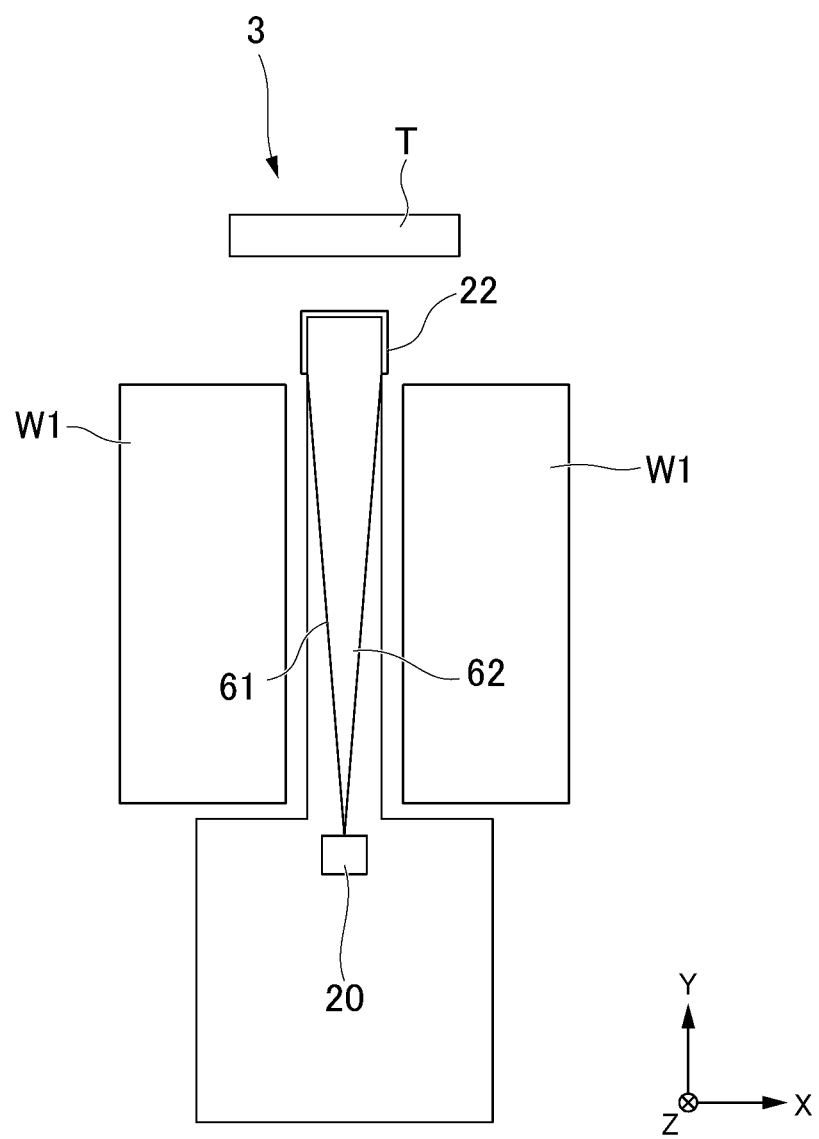
FIG. 8A is a view of a displacement sensor 3 according to the third embodiment viewed from the second surface side.

Next, a displacement sensor 3 according to the third embodiment will be described. FIG. 8A is a view of the displacement sensor 3 according to the third embodiment viewed from the second surface side, and FIG. 8B is a view of the displacement sensor 3 according to the third embodiment viewed from a lateral side. As shown in FIG. 8A, the board 10 includes the component disposition portion 11 and the coil mounting portion 12. The IC 20 is provided on the second surface of the component disposition portion 11.

The coil mounting portion 12 is provided so as to protrude in the Y direction from one side of the component disposition portion 11. The coil 22 is mounted on the coil mounting portion 12. The coil 22 has been described in the foregoing common elements. Also shown in FIG. 8B, the coil 22 is disposed so as to have less than one turn at a tip of the coil mounting portion 12 which is a position in the coil mounting portion 12 separated from the component disposition portion 11. For this reason, the coil 22 is provided at a part on the board side surface of the coil mounting portion 12, and a part of the coil mounting portion 12 is not provided with the coil 22, thereby being in an exposed state.

For example, the displacement sensor 3 according to the third embodiment is intended to measure the measurement object T which is provided inside a structure (obstacle) W1 which hinders a sensor from approaching the measurement object. The coil mounting portion 12 is inserted into the obstacle W1 through an insertion hole provided in the obstacle W1, and the coil 22 is caused to approach the measurement object T, thereby measuring displacement of the measurement object T. In the displacement sensor 3 according to the third embodiment, the length between the coil 22 and the component disposition portion 11 is a length equal to or longer than the length (thickness) of an outer frame of the obstacle W1.

The displacement sensor 3 according to the third embodiment exhibits operational effects which have been described in the foregoing first embodiment and the common elements in the second to seventh embodiments. In addition, in the displacement sensor 3 according to the third embodiment, the coil mounting portion 12 has a slender rectangular shape, and the coil 22 is provided on the coil mounting portion 12. For this reason, by inserting the coil mounting portion 12, in a case of measuring displacement of the measurement object T provided in a narrow region, for example, the measurement object T provided in the obstacle W1 such as a box, displacement of the measurement object T can be measured by inserting the coil mounting portion 12 through an insertion hole provided in the obstacle W1. Therefore, displacement of the measurement object T provided in a narrow space or the like can be detected.

In addition, in the displacement sensor 3 according to the third embodiment, the coil 22 is provided at the tip of the coil mounting portion 12 longer than the component disposition portion 11. For this reason, displacement of the measurement object T can be detected even at a position separated from the component disposition portion 11. In addition, since the length between the coil 22 and the component disposition portion 11 is a length equal to or longer than the thickness of the obstacle W1, displacement of the measurement object T can be measured while avoiding the obstacle W1. In addition, the coil mounting portion 12 has a slender rectangular shape of which the length in the Y direction is longer than the length in the X direction. For this reason, displacement of the measurement object T provided at a position separated from the component disposition portion 11 can be easily detected. The length between the coil 22 and the component disposition portion 11 can be set in accordance with the thickness of the obstacle W1. For example, when the obstacle W1 is thick, the length between the coil 22 and the component disposition portion 11 may be lengthened, and when the obstacle W1 is thin or the like, the length between the coil 22 and the component disposition portion 11 may be lengthened.

In addition, the IC 20 provided in the component disposition portion 11 and the coil 22 provided in the coil mounting portion 12 are connected to each other through the first lead wire 61 on the second surface side and the second lead wire 62 on the second surface side. For this reason, even when a separation distance between the IC 20 and the coil 22 has increased, the IC 20 and the coil 22 can be easily connected to each other. In addition, since a lot of room for disposing lead wires is allowed, the degree of freedom in design can be enhanced, and a likelihood of allowing attachment to an existing structure afterward can be enhanced. In addition, since the coil 22 itself has a low inductance, even if the inductance of the lead wire increases, an influence on the detection accuracy in the coil 22 can be reduced.

Fourth Embodiment

Figure 9:
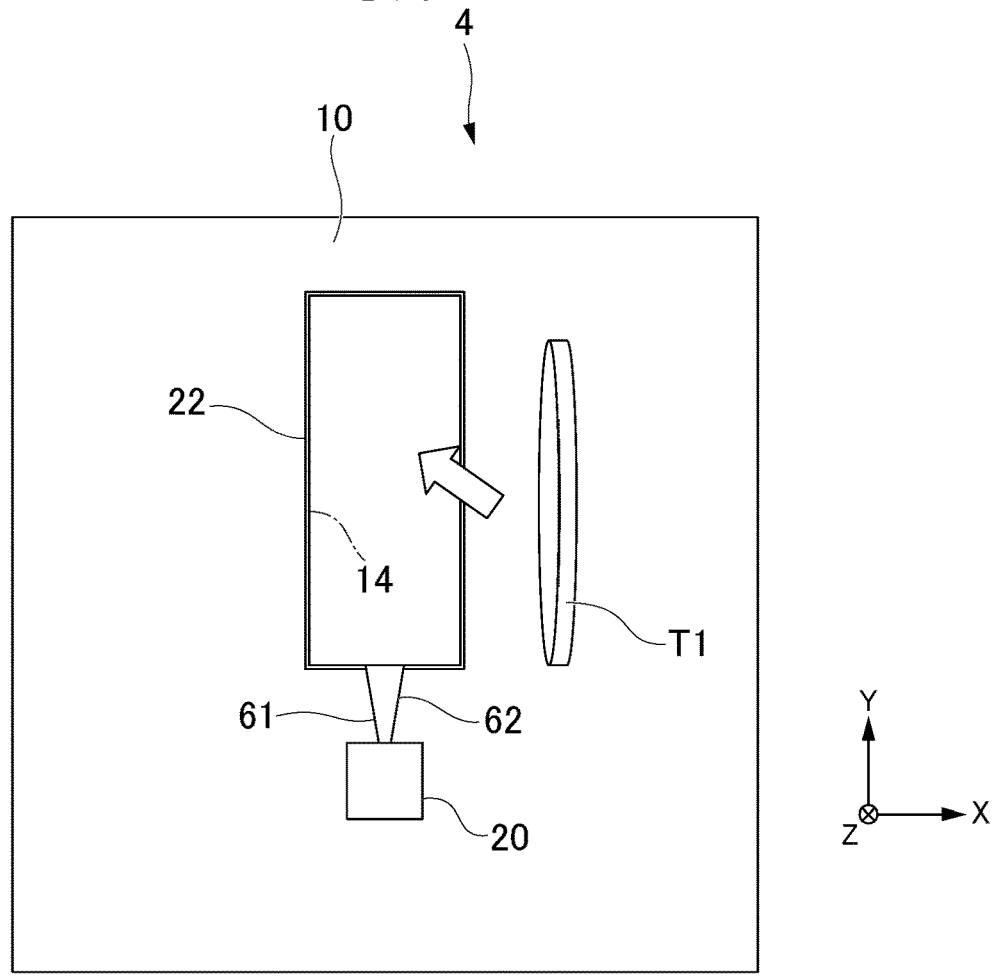
FIG. 9 is a view of a displacement sensor 4 according to the fourth embodiment viewed from the second surface side.

Next, a displacement sensor 4 according to the fourth embodiment will be described. FIG. 9 is a view of the displacement sensor 4 according to the fourth embodiment viewed from the second surface side. As shown in FIG. 9, the IC 20 is provided on the second surface of the board 10. The passing-through hole 14 through which a measurement object T1 passes at the time of measurement is provided above the IC 20. For example, the displacement sensor 4 according to the fourth embodiment handles the measurement object T1 having a disk shape as a measurement target. The width of the measurement object T1 is narrower than the width of the passing-through hole 14, and the height of the measurement object T1 is lower than the height of the passing-through hole 14 so as to be able to pass through the passing-through hole 14.

The coil 22 is mounted on an inner surface of the passing-through hole 14. The coil 22 has been described in the foregoing common elements. The coil 22 is disposed to have less than one turn along the inner surface of the passing-through hole 14.

The displacement sensor 4 according to the fourth embodiment exhibits operational effects which have been described in the foregoing first embodiment and the common elements in the second to seventh embodiments. In addition, in the displacement sensor 4 according to the fourth embodiment, since the coil 22 is disposed along the inner surface of the passing-through hole 14 provided in the coil mounting portion 12, the measurement object T1 passing through the passing-through hole in the Z direction can be detected with a high sensitivity from a position separated in the Z direction with respect to the board 10.

In addition, since the coil 22 has less than one turn, even if the size of the coil is increased, the inductance can be reduced. Moreover, since the coil 22 can be disposed at a position extremely close to the measurement object T1 passing through the passing-through hole 14, a large-sized object passing therethrough can be detected.

Particularly, when the coil 22 is provided on the inner surface of the passing-through hole 14, the measurement object can further approach the coil 22 than when the coil is provided along the passing-through hole 14 on one of or both the first surface and the second surface of the board 10. Therefore, when the coil 22 is provided on the inner surface of the passing-through hole 14, displacement of the measurement object can be measured with a higher sensitivity than when the coil is provided along the passing-through hole 14 on one of or both the first surface and the second surface of the board 10.

Figure 10:
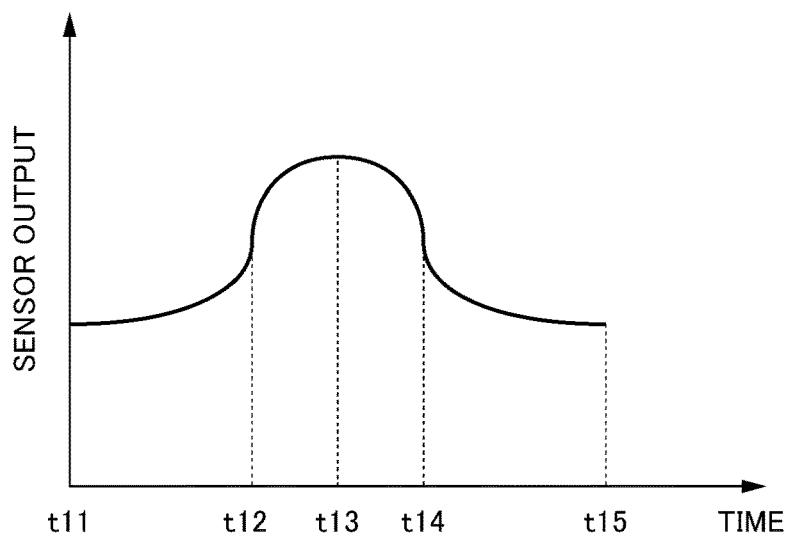
FIG. 10 is a graph showing an example of detection results of the displacement sensor 4 according to the fourth embodiment.

FIG. 10 is a graph showing an example of detection results of the displacement sensor 4 according to the fourth embodiment. In FIG. 10, the horizontal axis indicates a time when the measurement object T1 passes through the passing-through hole 14, and the vertical axis indicates a sensor output at a corresponding time. As shown in FIG. 10, at a time t11, in a stage where the measurement object T1 starts to pass through the passing-through hole 14, the sensor output is small, and the sensor output gradually increases until a time t12. After the time t12, in a stage where the diameter of the measurement object T1 increases, the sensor output significantly increases. Thereafter, at a time t13, after the diameter of the measurement object T1 becomes the largest, the sensor output significantly decreases, and at a time t14, after the diameter of the measurement object T1 is reduced, the sensor output continues to decrease. However, the amount of decrease is reduced, and the sensor output continues to gradually decrease. Thereafter, measurement of the measurement object ends at a time t15. According to such change in sensor output over time, the shape, the diameter, and the like of the measurement object T1 passing therethrough can be measured.

Fifth Embodiment

Figure 11A:
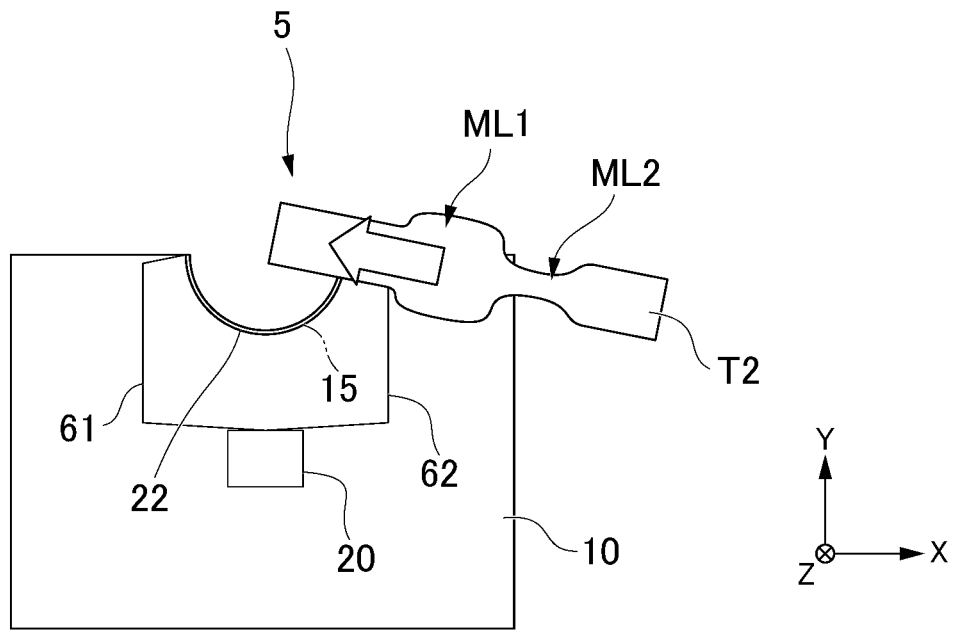
FIG. 11A is a view of a displacement sensor 5 according to the fifth embodiment viewed from the second surface side.
Figure 11B:
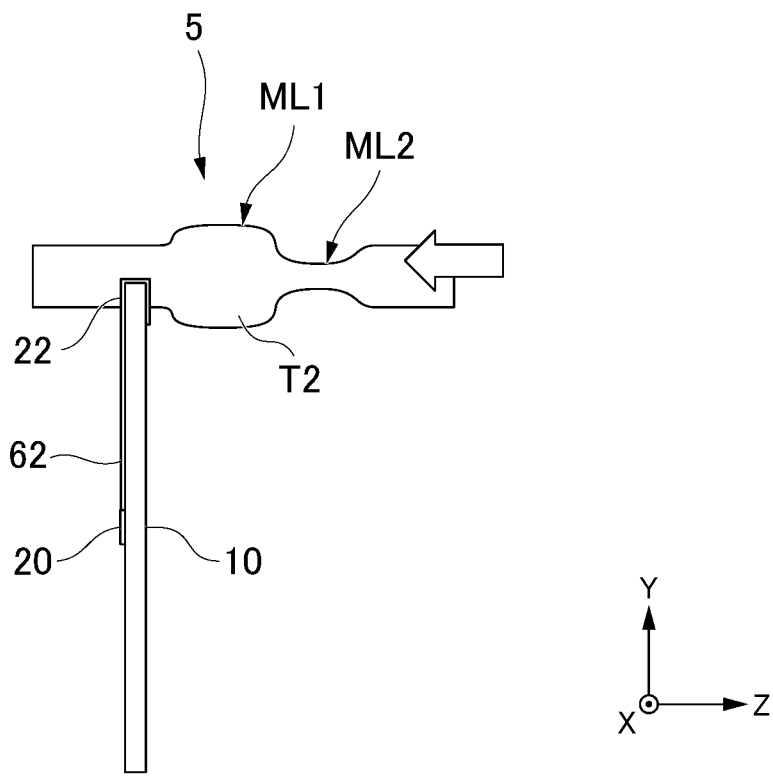
FIG. 11B is a view of the displacement sensor 5 according to the fifth embodiment viewed from a lateral side.

Next, a displacement sensor 5 according to the fifth embodiment will be described. FIG. 11A is a view of the displacement sensor 5 according to the fifth embodiment viewed from the second surface side, and FIG. 11B is a view of the displacement sensor 5 according to the fifth embodiment viewed from a lateral side. As shown in FIG. 11A, in the displacement sensor 5, the cutout portion 15 having a semi-circular shape of which one side is cut out is formed on the board 10. The cutout portion 15 is a part formed in a state in which a part of the board 10 is cut out. By cutting out one side of the board 10, the board 10 is cut out throughout the overall length in the thickness direction thereof. For example, the displacement sensor 5 according to the fifth embodiment handles a measurement object having a rod shape as a measurement target. The radius of the measurement object is shorter than the diameter of the cutout portion 15. In FIGS. 11A and 11B, as a measurement object, a measurement object T2 having a rod shape with a problematic place where the diameter in a longitudinal direction varies is depicted.

The coil 22 is mounted on the board 10. The coil 22 has been described in the foregoing common elements. The coil 22 is disposed to have less than one turn on an inner surface of the cutout portion 15. In the examples shown in FIGS. 11A and 11B, the coil 22 includes horizontal portions which are respectively disposed at end portions on the first surface and the second surface of the board 10, and a vertical portion which connects the horizontal portions to each other, and has a U-shaped cross section. The coil 22 may be disposed on the inner surface of the cutout portion 15 in a different form or may be disposed along the cutout portion 15 on one of or both the first surface and the second surface of the board 10. The coil 22 is formed across the entire surface of the cutout portion 15.

The displacement sensor 5 according to the fifth embodiment exhibits operational effects which have been described in the foregoing first embodiment and the common elements in the second to seventh embodiments. In addition, in the displacement sensor 5 according to the fifth embodiment, the cutout portion 15 is formed at one side of the board 10, and the coil 22 is disposed on the inner surface of the cutout portion 15. For this reason, since the measurement object T2 approaches the coil 22 in an upward direction (Y direction) of the board 10, limitation on an installation place for the displacement sensor 5 can be reduced, and thus the displacement sensor 5 can be easily installed. In addition, since the coil 22 is provided at an open position on a side of one side of the board 10, measurement of the large-sized measurement object T2 can be facilitated.

Figure 12:
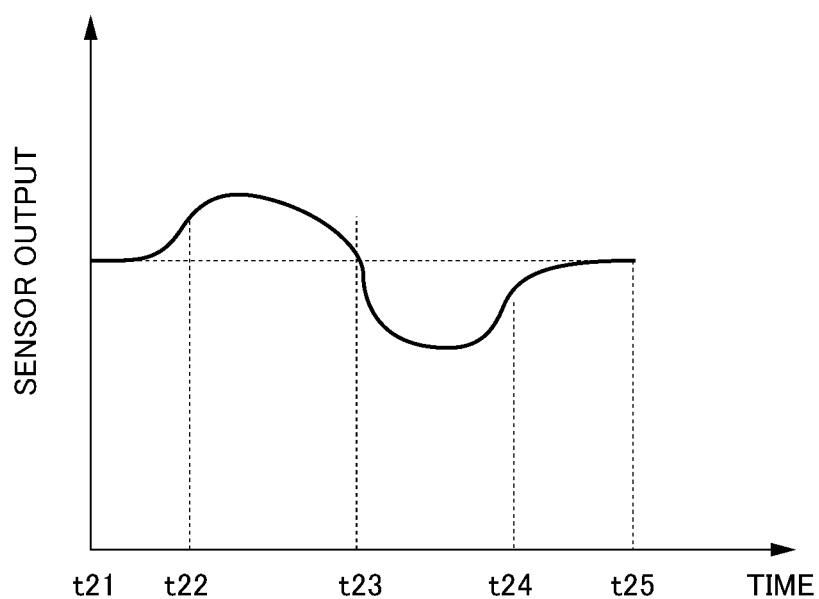
FIG. 12 is a graph showing an example of detection results of the displacement sensor 5 according to the fifth embodiment.

FIG. 12 is a graph showing an example of detection results of the displacement sensor 5 according to the fifth embodiment. In FIG. 12, the horizontal axis indicates a time when the measurement object T2 passes through the cutout portion 15 in the X direction, and the vertical axis indicates a sensor output at a corresponding time. In this example, the measurement object T2 should be originally manufactured in a cylindrical shape, but a problem of increase in diameter has occurred at a first problematic place ML1 and a problem of decrease in diameter has occurred at a second problematic place ML2.

As shown in FIG. 12, at a time t21, the sensor output gradually increases for a while after the measurement object T2 starts to pass through the cutout portion 15. During a time t22 to a time t23, when the first problematic place ML1 of the measurement object T2 shown in FIG. 11B passes through the cutout portion 15 of the displacement sensor 5, the sensor output significantly increases, and then the sensor output switches to decreasing. Moreover, when the second problematic place ML2 of the measurement object T2 passes through the cutout portion 15 of the displacement sensor 5 during the time t23 to a time t24, the sensor output decreases, and the sensor output which has decreased switched to increasing. After the second problematic place ML2 of the measurement object T2 passes through the cutout portion 15 of the displacement sensor 5 at the time t24, the sensor output gradually increases, and the measurement object T2 in its entirety passes through the cutout portion 15 at a time t25. In this manner, in the displacement sensor 5, based on increase and decrease in the sensor output, identification of a problem which has occurred in the measurement object T2 and a problematic place thereof, and identification of a shape which may cause a problem can be performed.

In the displacement sensor 5 according to the fifth embodiment, the cutout portion 15 has a semi-circular shape, but it may have a different shape. For example, the cutout portion 15 may have a V-shape in which two straight lines are connected with an acute angle, a right angle, or an obtuse angle therebetween, or may have a U-shape in which three straight lines are connected with an acute angle, a right angle, or an obtuse angle sandwiched therebetween. In addition, the coil 22 is formed across the entire surface of the cutout portion 15 but may be formed at a part of the cutout portion 15.

Sixth Embodiment

Figure 13:
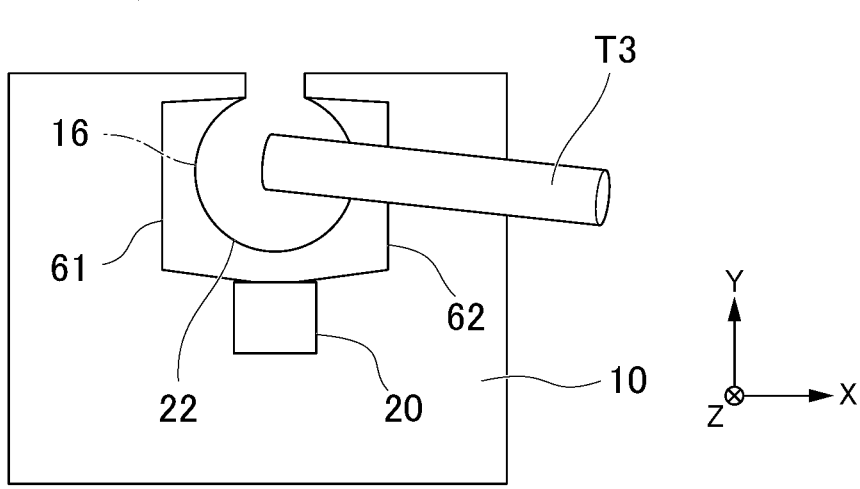
FIG. 13 is a view of a displacement sensor 6 according to the sixth embodiment viewed from the second surface side.

Next, a displacement sensor 6 according to the sixth embodiment will be described. FIG. 13 is a view of the displacement sensor 6 according to the sixth embodiment viewed from the second surface side. As shown in FIG. 13, in the displacement sensor 6, a hole portion 16 having a shape of which a part of the circular shape is cut out is provided at one side of the board 10. The hole portion 16 extends to a range exceeding 180° around a center point. For example, the displacement sensor 6 according to the sixth embodiment handles a measurement object having a rod shape as a measurement target. The diameter of a measurement object T3 is shorter than the length of a cutout part of the hole portion 16.

The coil 22 provided on the board 10 is disposed to have less than one turn along the hole portion 16 on the second surface of the board 10. The coil 22 has been described in the foregoing common elements. For example, the coil 22 is disposed to have less than one turn on an inner surface of the hole portion 16. The coil 22 is formed across the whole circumference of the hole portion 16. The coil 22 may be formed across a range excluding a part of the hole portion 16 without extending across the entire surface of the hole portion 16.

The displacement sensor 6 according to the sixth embodiment exhibits operational effects which have been described in the foregoing first embodiment and the common elements in the second to seventh embodiments. In addition, in the displacement sensor 6 according to the sixth embodiment, the hole portion 16 is formed at one side of the board 10, and the coil 22 is disposed on the inner surface of the hole portion 16. The displacement sensor 6 has a shape of which a part of the hole portion 16 is cut out. For this reason, the measurement object T3 can not only pass through the hole portion 16 in the Z direction but can also pass through the hole portion 16 from the place where a part of the hole portion 16 is cut out, and thus the displacement sensor 6 and the measurement object T3 can be easily installed.

Seventh Embodiment

Figure 14:
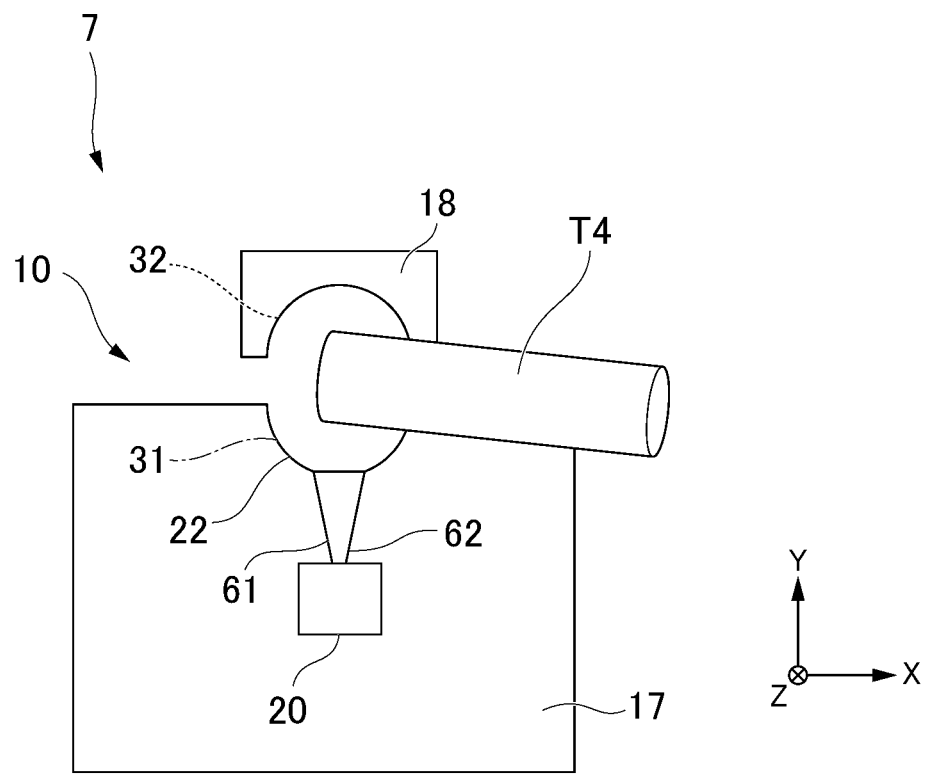
FIG. 14 is a view of a displacement sensor 7 according to the seventh embodiment viewed from the second surface side.

Next, a displacement sensor 7 according to the seventh embodiment will be described. FIG. 14 is a view of the displacement sensor 7 according to the seventh embodiment viewed from the second surface side. As shown in FIG. 14, in the displacement sensor 7, the board 10 includes a first board 17 and a second board 18. Electronic components such as the IC 20 are mounted on the first board 17. The second board 18 can be combined with the first board 17.

A first cutout portion 31 having a semi-circular shape is provided at one side of the first board 17, and a second cutout portion 32 having the same size and shape as the first cutout portion 31 is provided at one side of the second board 18. The second cutout portion 32 faces the first cutout portion 31 when the second board 18 is combined with the first board 17 and is disposed at a position where a connection hole 23 having a circular shape is formed by the first cutout portion 31 and the second cutout portion 32. For example, the displacement sensor 7 according to the seventh embodiment handles a measurement object T4 having a rod shape as a measurement target. The diameter of the measurement object T4 is shorter than the diameter of the connection hole 23 having a circular shape formed by the first cutout portion 31 and the second cutout portion 32.

The coil 22 provided on the board 10 is formed in a state in which a part thereof is cut at the first cutout portion 31 along the first cutout portion 31 and the second cutout portion 32. The coil 22 has been described in the foregoing common elements. Since the second board 18 is combined with the first board 17, for example, the coil 22 is disposed to have less than one turn on an inner surface of the connection hole 23.

The displacement sensor 7 according to the seventh embodiment exhibits operational effects which have been described in the foregoing first embodiment and the common elements in the second to seventh embodiments. In addition, in the displacement sensor 7 according to the seventh embodiment, the first board 17 and the second board 18 can be detached so that the connection hole 23 opens by detaching the second board 18 from the first board 17. For this reason, the measurement object T4 can be easily disposed on an inner side of the connection hole 23.

Regarding the second board 18, a plurality of second boards 18 having different shapes and sizes of the second cutout portions 32 may be combined with the first board 17. In this case, displacement of the measurement object T4 having various sizes can be detected by selecting the second board 18 corresponding to the size of the measurement object T4. In addition, since calibration (memory adjustment) may be required when the second board 18 is combined with the first board 17, countermeasures for calibration may be performed. In addition, the second boards 18 having different shapes and sizes may be combined with the first board 17.

Eighth Embodiment

Figure 15A:
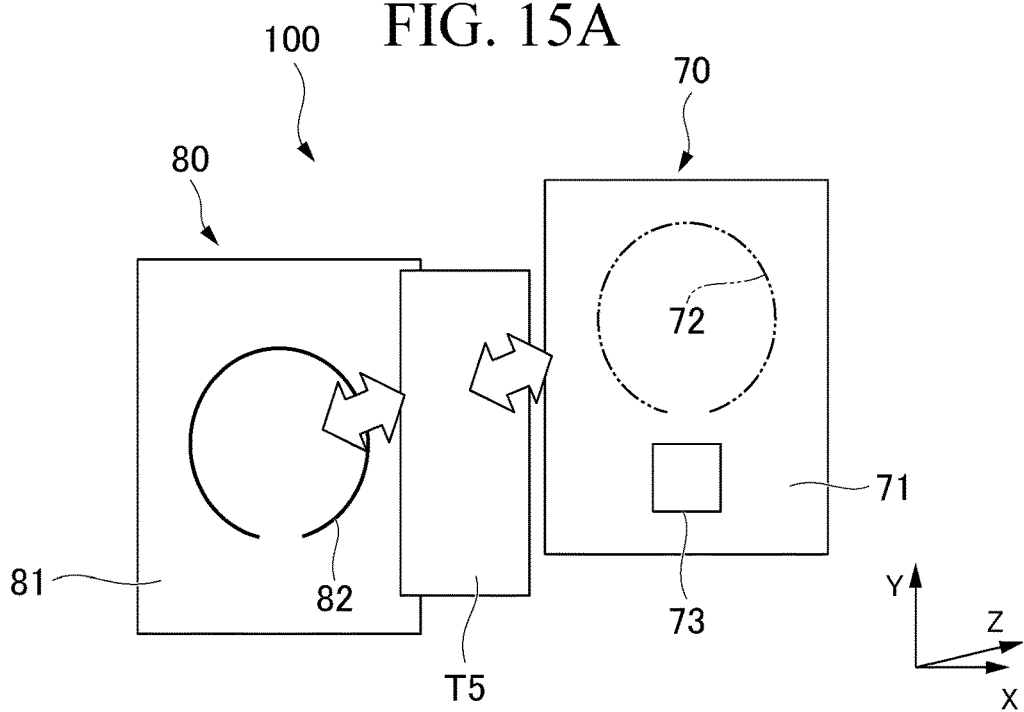
FIG. 15A is an exploded perspective view of a displacement sensor system 100 of an eighth embodiment.
Figure 15B:
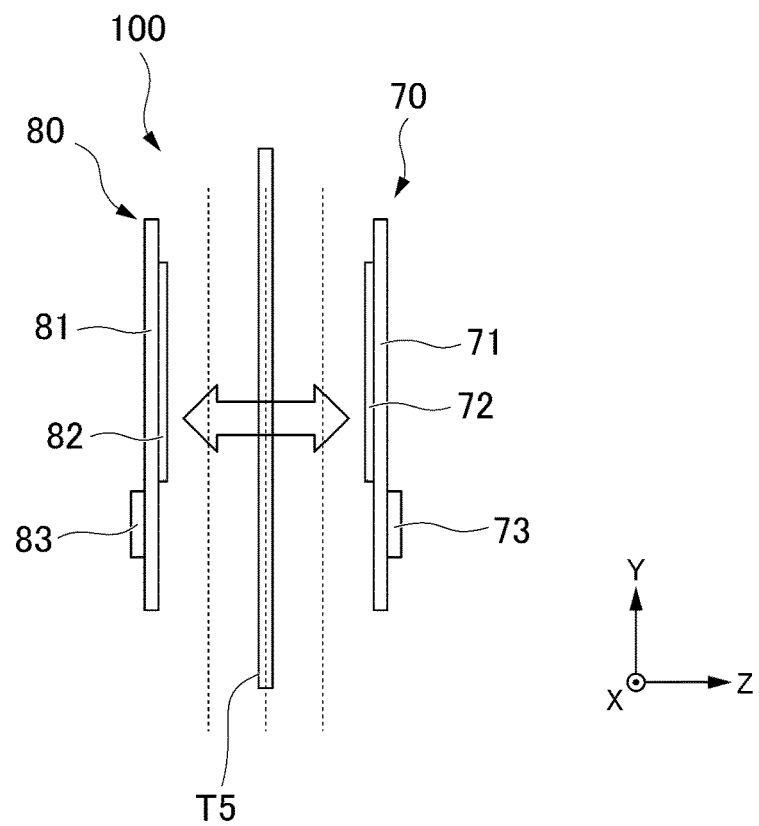
FIG. 15B is a view of the displacement sensor system 100 according to the eighth embodiment viewed from a lateral side.

Next, a displacement sensor system 100 according to the eighth embodiment will be described. FIG. 15A is an exploded perspective view of the displacement sensor system 100 according to the eighth embodiment, and FIG. 15B is a view of the displacement sensor system 100 according to the eighth embodiment viewed from a lateral side. As shown in FIG. 15A, the displacement sensor system 100 includes a first displacement sensor 70 and a second displacement sensor 80. The first displacement sensor 70 includes a first board 71 and a first coil 72, and the second displacement sensor 80 includes a second board 81 and a second coil 82. The first board 71 and the second board 81 have the same shape and size.

The first board 71 and the second board 81 are disposed so as to face each other. On a first surface of the first board 71 (a surface on a side facing the second board 81), the first coil 72 is formed to have less than one turn in a shape of which a part of the circular shape is cut out. On a first surface of the second board 81 (a surface on a side facing the first board 71), the second coil 82 is formed to have less than one turn in a shape of which a part of the circular shape is cut out. The first board 71 and the second board 81 are disposed at positions where the first coil 72 and the second coil 82 face each other. Electronic components such as a first IC 73 are mounted on a second surface of the first board 71, and electronic components such as a second IC 83 are mounted on a second surface of the second board 81. In the first board 71 and the second board 81, the first IC 73 and the second IC 83 are respectively connected to the first coil 72 and the second coil 82 via lead wires. The first IC 73 and the second IC 83 have configurations similar to that of the IC 20 of the first embodiment, and each of them outputs a frequency detected by the frequency detector 30 to the controller 40. For example, the first IC 73 includes a first inverter and a first frequency detector, and for example, the second IC 83 includes a second inverter and a second frequency detector.

For example, the displacement sensor system 100 according to the eighth embodiment measures displacement of a measurement object T5 having a plate shape. In the displacement sensor system 100, the measurement object T5 is disposed between the first board 71 and the second board 81, and the oscillation frequency detected by the first IC 73 and the second IC 83 respectively provided on the first board 71 and the second board 81 is output to the controller 40. The controller 40 converts a value indicating the oscillation frequency output from the frequency detector 30 included in each of the first IC 73 and the second IC 83 into a distance between the measurement object T5 and the first coil 72, thereby detecting displacement of the measurement object T5. The controller 40 is an example of a measure.

The displacement sensor system 100 according to the eighth embodiment exhibits operational effects equivalent to those of the displacement sensor 1 described in the foregoing first embodiment. In addition, in the displacement sensor system 100 according to the eighth embodiment, the first coil 72 and the second coil 82 are respectively provided on the first board 71 and the second board 81, and displacement of the measurement object T5 is detected on the basis of the oscillation frequency output by the first IC 73 and the second IC 83. For this reason, for example, when a measurement error occurs because of temperature change, the first IC 73 and the second IC 83 are affected by the error due to temperature change so that a similar measurement error occurs. Thus, the measurement error is offset by computing the measurement results obtained by each IC, for example, by performing subtraction. As a result, displacement of the measurement object can be detected with a high sensitivity.

In addition, since the sensitivities of the first coil 72 and the second coil 82 are enhanced, the separation distance between the first board 71 and the second board 81 capable of detecting displacement of the measurement object T5 can be increased.

Figure 16A:
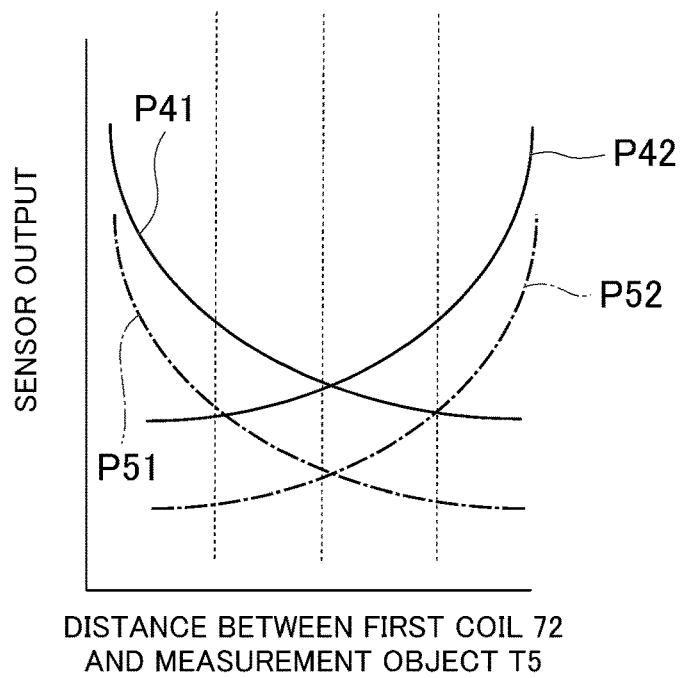
FIG. 16A is a graph showing a relationship between sensor outputs of a first IC 73 and a second IC 83, and a distance between a first coil 72 and a measurement object T5 in the displacement sensor system 100 according to the eighth embodiment.
Figure 16B:
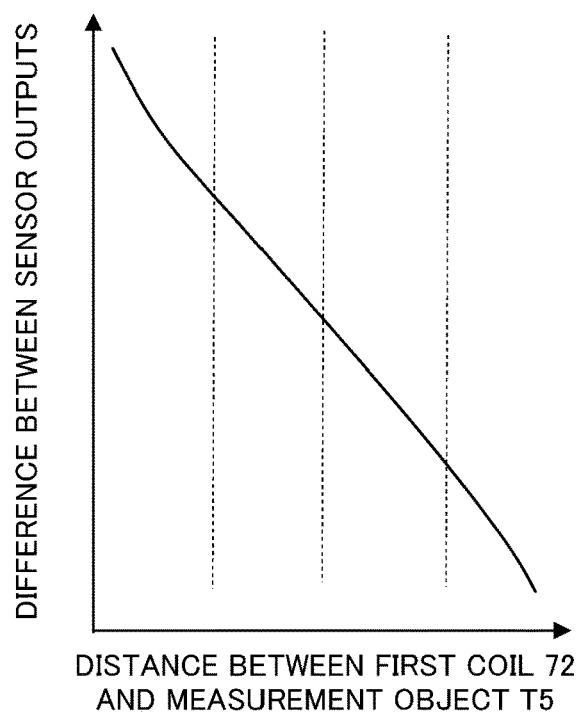
FIG. 16B is a graph showing a relationship between a difference between sensor outputs of the first IC 73 and the second IC 83, and the distance between the first coil 72 and the measurement object T5 in the displacement sensor system 100 according to the eighth embodiment.

FIG. 16A is a graph showing a relationship between the sensor outputs of the first IC 73 and the second IC 83 in the displacement sensor system 100 according to the tenth embodiment and the distance between the first coil 72 and the measurement object T5, and FIG. 16B is a graph showing a relationship between the difference between the sensor outputs of the first IC 73 and the second IC 83 in the displacement sensor system 100 and the distance between the first coil 72 and the measurement object T5. For example, as shown in FIG. 16A, it is assumed that a sensor output of the first IC 73 indicated by a first output graph P41 (which will hereinafter be referred to as "a first sensor output") and a sensor output of the second IC 83 indicated by a second output graph P42 (which will hereinafter be referred to as "a second sensor output") are obtained. At this time, it is assumed that an output of the displacement sensor system 100 includes an error due to an influence of the temperature. In this case, it is assumed that a sensor output of the first IC 73 when there is no influence of the temperature (which will hereinafter be referred to as "a first actual sensor output") is indicated by a first actual output graph P51, and a sensor output of the second IC 83 when there is no influence of the temperature (which will hereinafter be referred to as "a second actual sensor output") is indicated by a second actual output graph P52.

Here, it is assumed that a distance graph P60 indicating the distance between the first coil 72 and the measurement object T5 shown in FIG. 16B is obtained on the basis of the difference between the first sensor output and the second sensor output. Both the first sensor output and the second sensor output include an error based on an influence of the temperature. Therefore, the difference between the outputs of the first sensor and the second sensor becomes approximately equivalent to the difference between the first actual sensor output and the second actual sensor output. Even when there is an influence of the temperature or the like at the time of measurement, displacement of the measurement object can be detected with a high sensitivity by obtaining the distance between the first coil 72 and the measurement object T5 on the basis of the difference between the outputs of the first sensor and the second sensor.

In each of the foregoing embodiments, the sensitivity is enhanced as the wiring width of the coil 22 or the like increases. For this reason, the wiring width of the coil 22 or the like may be increased. In addition, the sensitivity is enhanced as the lead wiring or the like is shortened. For this reason, the lead wiring or the like may be shortened. In addition, the lead wiring or the like may be wired not only on the first surface or the second surface of the board but may also be wired on the board side surface or may also be wired so as to straddle these surfaces. In addition, the board may be a board, such as a flexible board or a rigid flexible board, which can be bent. In this case, a coil may be attached after the board is bent, or the board may be bent after a coil is attached. In addition, a shield material may be provided such that the lead wiring or the like does not pick up noise. In addition, the coil may be generated using a material used for printed boards. For example, a patterned coil may be generated by performing etching with copper, or the like. In addition, the frequency may be adjusted by attaching a capacitor into a through hole, or the like. In addition, a different IC, an input connector, and the like may be provided in addition to the IC 20 shown in the first embodiment and the like.

While a number of embodiments of the present inventions have been described, these embodiments have been presented by way of example only, and are not intended to limit the scope of the inventions. Indeed, these embodiments may be embodied in a variety of other forms, furthermore, various omissions, substitutions and changes in the form of these embodiments may be made without departing from the spirit of the inventions. The accompanying claims and their equivalents are intended to cover such embodiments or modifications as would fall within the scope and spirit of the inventions.

REFERENCE SIGNS LIST 1 to 7 Displacement sensor
10 Board
11 Component disposition portion
12 Coil mounting portion
14 Passing-through hole
15 Cutout portion
16 Hole portion
17, 71 First board
18, 81 Second board
22 Coil
31 First cutout portion
32 Second cutout portion 70 First displacement sensor
72 First coil
73 First IC
80 Second displacement sensor
82 Second coil
83 Second IC
T, T1 to T5 Measurement object

The invention claimed is:

1. A displacement sensor comprising:
a coil which is mounted on a board and which is formed to have less than one turn;
an inverter electrically connected to the coil, the inverter being configured to generate an oscillation signal; and
a frequency detector electrically connected to the inverter, the frequency detector being configured to detect an oscillation frequency of an oscillator circuit including the coil and the inverter in accordance with a distance between a measurement object and the coil.

2. The displacement sensor according to claim 1,
wherein a lead wire is connected to the coil, and
the coil and the lead wire are formed to have less than one turn.

3. The displacement sensor according to claim 1,
wherein the coil is disposed along an end portion of a coil mounting portion on which the coil is mounted.

4. The displacement sensor according to claim 1,
wherein the coil is disposed on a board side surface of a coil mounting portion on which the coil is mounted.

5. The displacement sensor according to claim 4,
wherein the coil includes horizontal portions which are respectively disposed on both surfaces of an end portion of the coil mounting portion, and a vertical portion which connects the horizontal portions to each other and which is disposed along the board side surface.

6. The displacement sensor according to claim 3,
wherein the board includes
a component disposition portion on which the inverter and the frequency detector are provided, and
a coil mounting portion which protrudes from a part of the component disposition portion and on which the coil is mounted.

7. The displacement sensor according to claim 6,
wherein the coil mounting portion has a shape with a length in a first direction protruding from the component disposition portion and a length in a second direction orthogonal to the first direction, and
wherein the length of the coil mounting portion in the first direction is longer than the length in the second direction.

8. The displacement sensor according to claim 3,
wherein a passing-through hole through which the measurement object passes at a time of measurement is formed in the board, and
wherein the coil is disposed on an inner surface of the passing-through hole.

9. The displacement sensor according to claim 3,
wherein a cutout portion is formed at one side of the board, and
wherein the coil is disposed on an inner surface of the cutout portion.

10. The displacement sensor according to claim 3,
wherein in the board,
a passing-through hole through which the measurement object passes at a time of measurement, and
a cutout portion which is formed by cutting out between the passing-through hole and one side of the board are formed, and
wherein the coil is disposed on an inner surface of the passing-through hole.

11. The displacement sensor according to claim 3,
wherein the board includes a first board and a second board which is combined with the first board,
wherein a first cutout portion is formed at one side of the first board, and a second cutout portion is formed at one side of the second board,
wherein when the first board and the second board are arranged at positions where the first cutout portion and the second cutout portion face each other, a passing-through hole through which the measurement object passes at a time of measurement is formed by the first cutout and the second cutout portion, and
wherein the coil is disposed along at least one of an inner surface of the first cutout portion and an inner surface of the second cutout.

12. A displacement sensor system comprising:
a first coil which is mounted on a first board and which is formed to have less than one turn;
a second coil which is mounted on a second board and which is formed to have less than one turn;
a first inverter electrically connected to the first coil, the first inverter being configured to generate an oscillation signal;
a second inverter electrically connected to the second coil, the second inverter being configured to generate an oscillation signal;
a first frequency detector which is a frequency detector electrically connected to the first inverter, the first frequency detector being configured to detect an oscillation frequency of an oscillator circuit including the first coil and the first inverter in accordance with a distance between a measurement object disposed between the first coil and the second coil facing each other and the first coil;
a second frequency detector which is a frequency detector electrically connected to the second inverter, the second frequency detector being configured to detect an oscillation frequency of an oscillator circuit including the second coil and the second inverter in accordance with a distance between the measurement object and the second coil; and
a measure configured to measure displacement of the measurement object on the basis of an oscillation frequency detected by the first frequency detector and an oscillation frequency detected by the second frequency detector.

* * * * *